(12) United States Patent
Sumiya

(10) Patent No.: US 11,977,740 B2
(45) Date of Patent: May 7, 2024

(54) CARTRIDGE MANAGEMENT SYSTEM, METHOD OF OPERATING CARTRIDGE MANAGEMENT SYSTEM, AND PROGRAM

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 21 days.

(21) Appl. No.: 18/060,968

(22) Filed: Dec. 2, 2022

(65) Prior Publication Data

US 2023/0092721 A1 Mar. 23, 2023

Related U.S. Application Data

(63) Continuation of application No. PCT/JP2021/018101, filed on May 12, 2021.

(30) Foreign Application Priority Data

Jun. 15, 2020 (JP) ................................. 2020-103231

(51) Int. Cl.
*G06F 3/06* (2006.01)
*G11B 5/008* (2006.01)
*G11B 15/68* (2006.01)

(52) U.S. Cl.
CPC ............ *G06F 3/0616* (2013.01); *G06F 3/065* (2013.01); *G06F 3/0653* (2013.01);
(Continued)

(58) Field of Classification Search
CPC ...... G06F 3/0616; G06F 3/065; G06F 3/0653; G06F 3/0686; G06F 3/0607; G06F 3/0649; G11B 5/008; G11B 15/689; G11B 27/00
See application file for complete search history.

(56) References Cited

U.S. PATENT DOCUMENTS 5,522,090 A 5/1996 Tanaka et al.
10,228,873 B2 * 3/2019 Crawford .............. G06F 3/0616
(Continued)

FOREIGN PATENT DOCUMENTS

JP H06-236608 A 8/1994
JP H09-282201 A 10/1997
(Continued)

OTHER PUBLICATIONS

International Search Report issued in International Application No. PCT/JP2021/018101 dated Aug. 17, 2021.
(Continued)

*Primary Examiner* — Khoa D Doan
(74) *Attorney, Agent, or Firm* — SOLARIS Intellectual Property Group, PLLC

(57) ABSTRACT

A cartridge management system that manages a plurality of cartridges, in each of which a magnetic tape is housed, includes a processor, and a memory incorporated in or connected to the processor, in which the processor is configured to execute data rewrite-in processing of rewriting data stored in the magnetic tape, in a specific cartridge among the plurality of cartridges based on an access frequency indicating a frequency of access to the data, and cartridge replacement processing of replacing the data stored in the magnetic tape of the specific cartridge and the data stored in the magnetic tape of another cartridge among the plurality of cartridges.

11 Claims, 17 Drawing Sheets

(52) U.S. Cl.
CPC ............ *G06F 3/0686* (2013.01); *G11B 5/008* (2013.01); *G11B 15/689* (2013.01)

(56) References Cited

U.S. PATENT DOCUMENTS

| | | | |
|---|---|---|---|
| 2006/0101084 A1* | 5/2006 | Kishi | G06F 3/0647 |
| 2008/0027905 A1 | 1/2008 | Jensen et al. | |
| 2009/0132621 A1 | 5/2009 | Jensen et al. | |
| 2011/0087657 A1 | 4/2011 | Jensen et al. | |
| 2011/0149707 A1* | 6/2011 | Ozeki | G06F 3/0686 |
| | | | 369/84 |
| 2011/0167230 A1 | 7/2011 | Quan et al. | |
| 2011/0258186 A1 | 10/2011 | Jensen et al. | |
| 2011/0270839 A1 | 11/2011 | Jensen et al. | |
| 2014/0108392 A1 | 4/2014 | Jensen et al. | |
| 2016/0140118 A1 | 5/2016 | Hasegawa et al. | |
| 2017/0132221 A1 | 5/2017 | Hasegawa et al. | |
| 2018/0018124 A1 | 1/2018 | Kudo | |
| 2019/0258608 A1 | 8/2019 | Hasegawa et al. | |
| 2021/0343313 A1* | 11/2021 | Prigge | G11B 23/287 |

FOREIGN PATENT DOCUMENTS

| | | |
|---|---|---|
| JP | H11-31376 A | 2/1999 |
| JP | 2011-513805 A | 4/2011 |
| JP | 2013-161185 A | 8/2013 |
| JP | 2016-099723 A | 5/2016 |
| JP | 2017-016723 A | 1/2017 |
| WO | 2016/132572 A1 | 8/2016 |

OTHER PUBLICATIONS

Written Opinion of the ISA issued in International Application No. PCT/JP2021/018101 dated Aug. 17, 2021.

* cited by examiner

FIG. 8

DATA TABLE (32)

| DATA NUMBER | CARTRIDGE NUMBER | ACCESS FREQUENCY (TIMES) |
|---|---|---|
| 0001 | CN1 | 5 |
| 0002 | CN1 | 78 |
| 0003 | CN1 | 36 |
| ⋮ | ⋮ | ⋮ |
| 0100 | CN20 | 14 |

⇩ CREATE

HIGH-ACCESS FREQUENCY DATA TABLE (92)

| REFERENCE NUMERAL | DATA NUMBER | CARTRIDGE NUMBER | ACCESS FREQUENCY (TIMES) |
|---|---|---|---|
| FD1 | 0065 | CN13 | 93 |
| FD2 | 0031 | CN7 | 88 |
| FD3 | 0002 | CN1 | 78 |
| FD4 | 0009 | CN2 | 75 |
| FD5 | 0088 | CN18 | 72 |

DATA TABLE (BEFORE DATA REWRITE-IN PROCESSING) 32-1

| DATA NUMBER | CARTRIDGE NUMBER | ACCESS FREQUENCY (TIMES) |
|---|---|---|
| 0001 | CN1 | 5 |
| 0002 | CN1 | 78 |
| 0003 | CN1 | 36 |
| ⋮ | ⋮ | ⋮ |
| 0100 | CN20 | 14 |

DATA TABLE (AFTER DATA REWRITE-IN PROCESSING) 32-2

| DATA NUMBER | CARTRIDGE NUMBER | ACCESS FREQUENCY (TIMES) |
|---|---|---|
| 0001 | CN1 | 0 |
| 0002 | CN21 | 0 |
| 0003 | CN1 | 0 |
| ⋮ | ⋮ | ⋮ |
| 0100 | CN20 | 0 |

CARTRIDGE TABLE (BEFORE DATA REWRITE-IN PROCESSING) 34-1

| CARTRIDGE NUMBER | CELL NUMBER | USE FREQUENCY (TIMES) |
|---|---|---|
| CN1 | A1 | 150 |
| CN2 | A2 | 345 |
| ⋮ | ⋮ | ⋮ |
| CN20 | B10 | 55 |

CARTRIDGE TABLE (AFTER DATA REWRITE-IN PROCESSING) 34-2

| CARTRIDGE NUMBER | CELL NUMBER | USE FREQUENCY (TIMES) |
|---|---|---|
| CN1 | C1 | 150 |
| CN2 | A2 | 345 |
| ⋮ | ⋮ | ⋮ |
| CN20 | B10 | 55 |
| CN21 | A1 | 0 |

FIG. 12

CARTRIDGE TABLE (BEFORE DATA REWRITE-IN PROCESSING) 34-3

| CARTRIDGE NUMBER | CELL NUMBER | USE FREQUENCY (TIMES) |
|---|---|---|
| CN1 | C1 | 2459 |
| CN2 | A2 | 3633 |
| : | : | : |
| CN7 (LC) | A7 | 633 |
| : | : | : |
| CN20 | B10 | 1498 |
| CN21 (HC) | A1 | 10000 |

⬇

CARTRIDGE TABLE (AFTER DATA REWRITE-IN PROCESSING) 34-4

| CARTRIDGE NUMBER | CELL NUMBER | USE FREQUENCY (TIMES) |
|---|---|---|
| CN1 | C1 | 2459 |
| CN2 | A2 | 3633 |
| : | : | : |
| CN7 (LC) | A1 | 633 |
| : | : | : |
| CN20 | B10 | 1498 |
| CN21 (HC) | A7 | 10000 |

FIG. 13

DATA TABLE (BEFORE DATA REWRITE-IN PROCESSING) (32-3)

| DATA NUMBER | CARTRIDGE NUMBER | ACCESS FREQUENCY (TIMES) |
|---|---|---|
| 0001 | CN1 | 65 |
| 0002 | CN21 | 486 |
| 0003 | CN1 | 178 |
| : | : | : |
| 0031 | CN7 | 44 |
| 0032 | CN7 | 18 |
| : | : | : |

⬇

DATA TABLE (AFTER DATA REWRITE-IN PROCESSING) (32-4)

| DATA NUMBER | CARTRIDGE NUMBER | ACCESS FREQUENCY (TIMES) |
|---|---|---|
| 0001 | CN1 | 65 |
| 0002 | CN7 | 486 |
| 0003 | CN1 | 178 |
| : | : | : |
| 0031 | CN21 | 44 |
| 0032 | CN21 | 18 |
| : | : | : |

CARTRIDGE MANAGEMENT SYSTEM, METHOD OF OPERATING CARTRIDGE MANAGEMENT SYSTEM, AND PROGRAM

CROSS-REFERENCE TO RELATED APPLICATIONS

This application is a continuation application of International Application No. PCT/JP2021/018101, filed on May 12, 2021, the disclosure of which is incorporated herein by reference in its entirety. Further, this application claims priority from Japanese Patent Application No. 2020-103231, filed on Jun. 15, 2020, the disclosure of which is incorporated herein by reference in its entirety.

BACKGROUND

1. Technical Field

A technique of the present disclosure relates to a cartridge management system, a method for operating a cartridge management system, and a program.

2. Related Art

JP1997-282201A (JP-H09-282201A) discloses an information storage and management device having a storage device where a plurality of kinds of information are accumulated and a control device that controls a recording and reproduction operation of the storage device. The storage device is configured with recording and reproduction means, a first storage device that is configured with an interchangeable storage medium loaded into the recording and reproduction means and configured to perform recording and reproduction, and a management information storage device that stores the number of times of access to another kinds of information to be accessed in relation to a certain kind of information, as history management information. The control device performs control based on the history management information stored in the management information storage device such that second information related to first information is stored in the same storage medium along with the first information in a lump.

JP1999-031376A (JP-H11-031376A) discloses an information recording and reproduction device in which a tape-shaped recording medium is stored in a cartridge and which performs recording and reproduction of a tape cassette with a non-volatile memory provided in the cartridge. The information recording and reproduction device has means for storing, in using the tape-shaped recording medium while dividing the tape-shaped recording medium into a plurality of partitions, information indicating an access frequency of each partition in the non-volatile memory, and a controller that performs control such that, in copying the tape, and a controller that performs control such that information regarding the access frequency of each partition is read out from the non-volatile memory and copied data is recorded in a tape-shaped recording medium of a new tape cassette in an order depending on the access frequency.

JP2017-016723A discloses a library device comprising a magazine that stores an inserted recording medium and that is provided with one or more deep cells in which a plurality of cells each storing the recording medium are disposed in series in an insertion direction of the recording medium, an access frequency determination unit that determines whether or not an access frequency to the recording medium is higher than a predetermined port-side determination criterion or more, based on an access history to the recording medium stored in the cell, and a storage cell decision unit that decides the cell for storing the recording medium to a predetermined cell served to be a cell at a position closer to an insertion port among the plurality of cells disposed in the deep cell in a case where the access frequency determination unit determines that the access frequency to the recording medium is higher than the port-side determination criterion or more.

JP2011-513805A discloses a method that is realized by a computer and includes a step of acquiring an attribute regarding each of a plurality of storage locations, a step of acquiring a file and a file type of the file, a step of acquiring at least one usage statistic associated with the file type, at least one usage statistic being generated by monitoring the usage of the file having the file type, a step of selecting a first storage location among the plurality of storage locations for storing the file based on an attribute of the first storage location and at least usage statistic associated with the file type of the file, and a step of storing the file in the first storage location.

SUMMARY

An embodiment according to the technique of the present disclosure provides a cartridge management system, a method for operating a cartridge management system, and a program capable of extending service life of all of a plurality of cartridges.

A first aspect according to the technique of the present disclosure is a cartridge management system that manages a plurality of cartridges, in each of which a magnetic tape is housed, the cartridge management system comprising a processor, and a memory incorporated in or connected to the processor, in which the processor is configured to execute data rewrite-in processing of rewriting data stored in the magnetic tape, in a specific cartridge among the plurality of cartridges based on an access frequency indicating a frequency of access to the data, and cartridge replacement processing of replacing the data stored in the magnetic tape of the specific cartridge and the data stored in the magnetic tape of another cartridge among the plurality of cartridges.

A second aspect according to the technique of the present disclosure is the cartridge management system according to the first aspect, in which, in the data rewrite-in processing, the processor is configured to rewrite high-access frequency data that is data having the access frequency higher than a reference access frequency, in the specific cartridge to aggregate the high-access frequency data in the specific cartridge.

A third aspect according to the technique of the present disclosure is the cartridge management system according to the first aspect, in which the other cartridge is a cartridge having a use frequency lower than a first reference use frequency among the plurality of cartridges.

A fourth aspect according to the technique of the present disclosure is the cartridge management system according to any one of the first aspect to the third aspect, in which the specific cartridge is a cartridge having a use frequency lower than a second reference use frequency among the plurality of cartridges.

A fifth aspect according to the technique of the present disclosure is the cartridge management system according to any one of the first aspect to the third aspect, in which the specific cartridge is a new cartridge.

A sixth aspect according to the technique of the present disclosure is the cartridge management system according to any one of the first aspect to the fifth aspect, in which the processor is configured to execute the data rewrite-in processing at regular intervals.

A seventh aspect according to the technique of the present disclosure is the cartridge management system according to any one of the first aspect to the sixth aspect, in which the processor is configured to execute the cartridge replacement processing at regular intervals.

An eighth aspect according to the technique of the present disclosure is the cartridge management system according to any one of the first aspect to the sixth aspect, in which the processor is configured to execute the cartridge replacement processing depending on a use count of the cartridge.

A ninth aspect according to the technique of the present disclosure is the cartridge management system according to any one of the first aspect to the eighth aspect, in which the plurality of cartridges are housed in cells of a container in units of a predetermined number of cartridges, and the processor is configured to cause a transport mechanism provided in the container to take out the specific cartridge from the cell and to load the specific cartridge taken out from the cell by the transport mechanism into a magnetic tape drive.

A tenth aspect according to the technique of the present disclosure is the cartridge management system according to the ninth aspect, in which the cell is a cell having a shortest transport path through which the specific cartridge is transported from the cell to the magnetic tape drive by the transport mechanism.

An eleventh aspect according to the technique of the present disclosure is a method for operating a cartridge management system that includes a processor and manages a plurality of cartridges, in each of which a magnetic tape is housed, the method comprising executing data rewrite-in processing of rewriting data stored in the magnetic tape, in a specific cartridge among the plurality of cartridges based on an access frequency indicating a frequency of access to the data, and executing cartridge replacement processing of replacing the data stored in the magnetic tape of the specific cartridge and the data stored in the magnetic tape of another cartridge among the plurality of cartridges.

A twelfth aspect according to the technique of the present disclosure is a program causing a computer, which is applied to a cartridge management system that manages a plurality of cartridges, in each of which a magnetic tape is housed, to execute a process comprising executing data rewrite-in processing of rewriting data stored in the magnetic tape, in a specific cartridge among the plurality of cartridges based on an access frequency indicating a frequency of access to the data, and executing cartridge replacement processing of replacing the data stored in the magnetic tape of the specific cartridge and the data stored in the magnetic tape of another cartridge among the plurality of cartridges.

BRIEF DESCRIPTION OF THE DRAWINGS

Exemplary embodiments of the technology of the disclosure will be described in detail based on the following figures, wherein:

FIG. 8 is an explanatory view showing an example of a high-access frequency data table that is created based on the data table;

FIG. 12 is an explanatory view showing an example of a changed place of the cartridge table in cartridge replacement processing;

FIG. 13 is an explanatory view showing an example of a changed place of the data table in the cartridge replacement processing;

DETAILED DESCRIPTION

Hereinafter, an example of an embodiment of a cartridge management system, a method for operating a cartridge management system, and a program according to the technique of the present disclosure will be described following the accompanying drawings.

First, terms that are used in the following description will be described.

CPU is an abbreviation for "Central Processing Unit". RAM is an abbreviation for "Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". EL is an abbreviation for "Electro-Luminescence".

In the description of the specification, "parallel" indicates parallel in a meaning including an error that is generally allowed in the technical field to which the technique of the present disclosure belongs, and an error to such an extent not contrary to the spirit and scope of the technique of the present disclosure, in addition to completely parallel. In the description of the specification, "vertical" indicates vertical in a meaning including an error that is generally allowed in the technical field to which the technique of the present disclosure belongs, and an error to such an extent not contrary to the spirit and scope of the technique of the present disclosure, in addition to completely vertical. In the description of the specification, "perpendicular" indicates perpendicular in a meaning including an error that is generally allowed in the technical field to which the technique of the present disclosure belongs, and an error to such an extent not contrary to the spirit and scope of the technique of the present disclosure, in addition to completely perpendicular. In the description of the specification, "equal" indicates equal in a meaning including an error that is generally allowed in the technical field to which the technique of the present disclosure belongs, and an error to such an extent not contrary to the spirit and scope of the technique of the present disclosure, in addition to completely equal.

Figure 1:
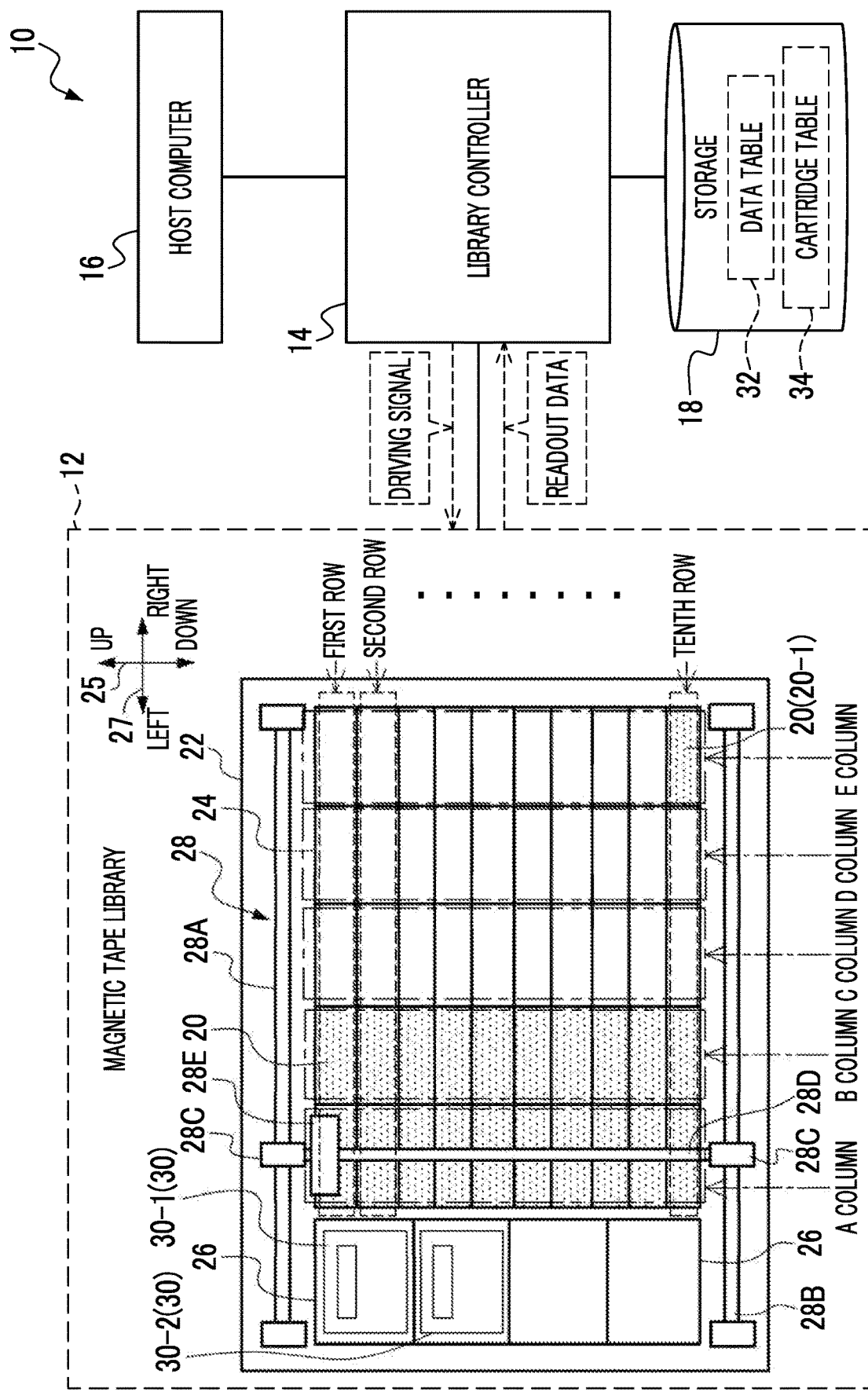
FIG. 1 is a schematic configuration diagram showing an example of a configuration of a cartridge management system.

As shown in FIG. 1 as an example, a cartridge management system 10 comprises a magnetic tape library 12, a library controller 14, a host computer 16, and a storage 18.

Figure 2:
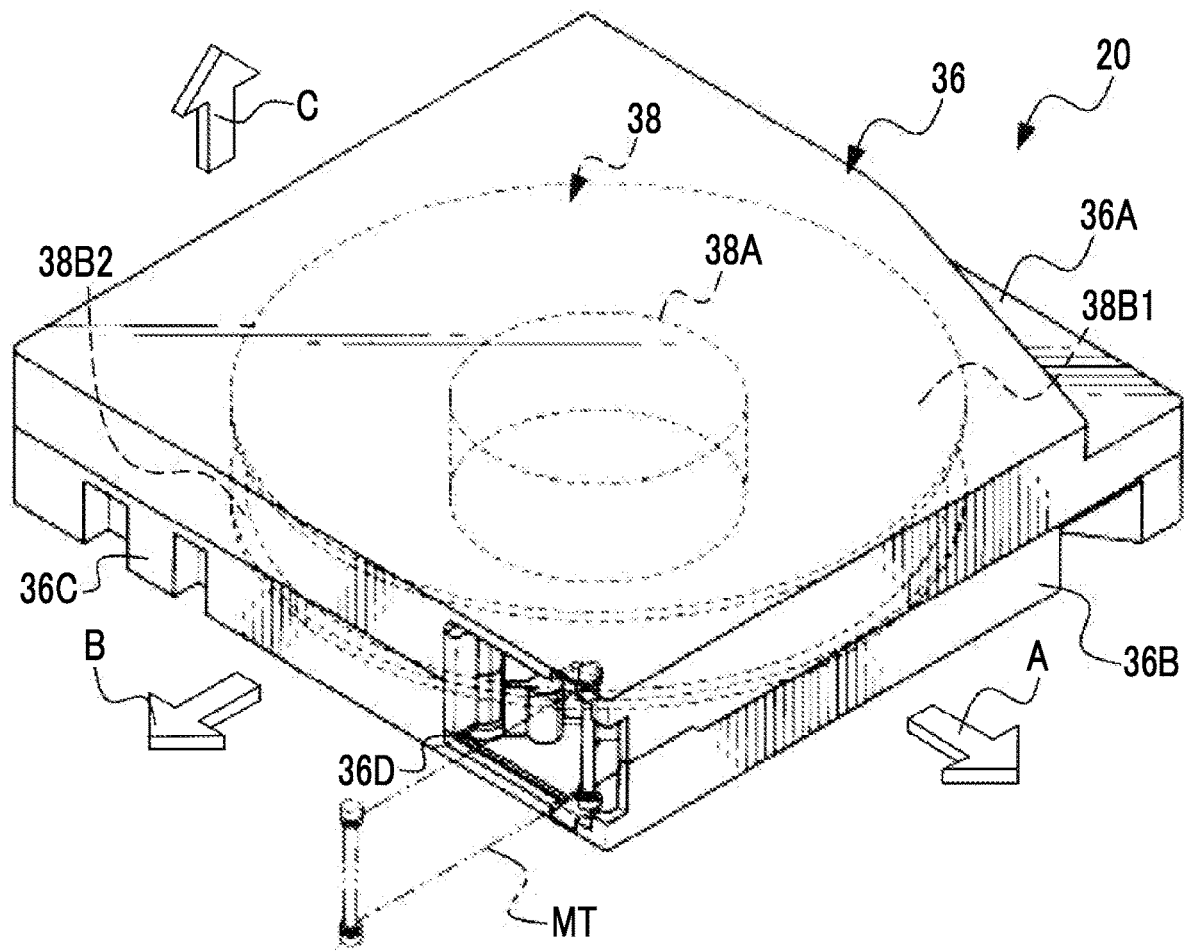
FIG. 2 is a schematic perspective view showing an example of an appearance of a cartridge.
Figure 3:
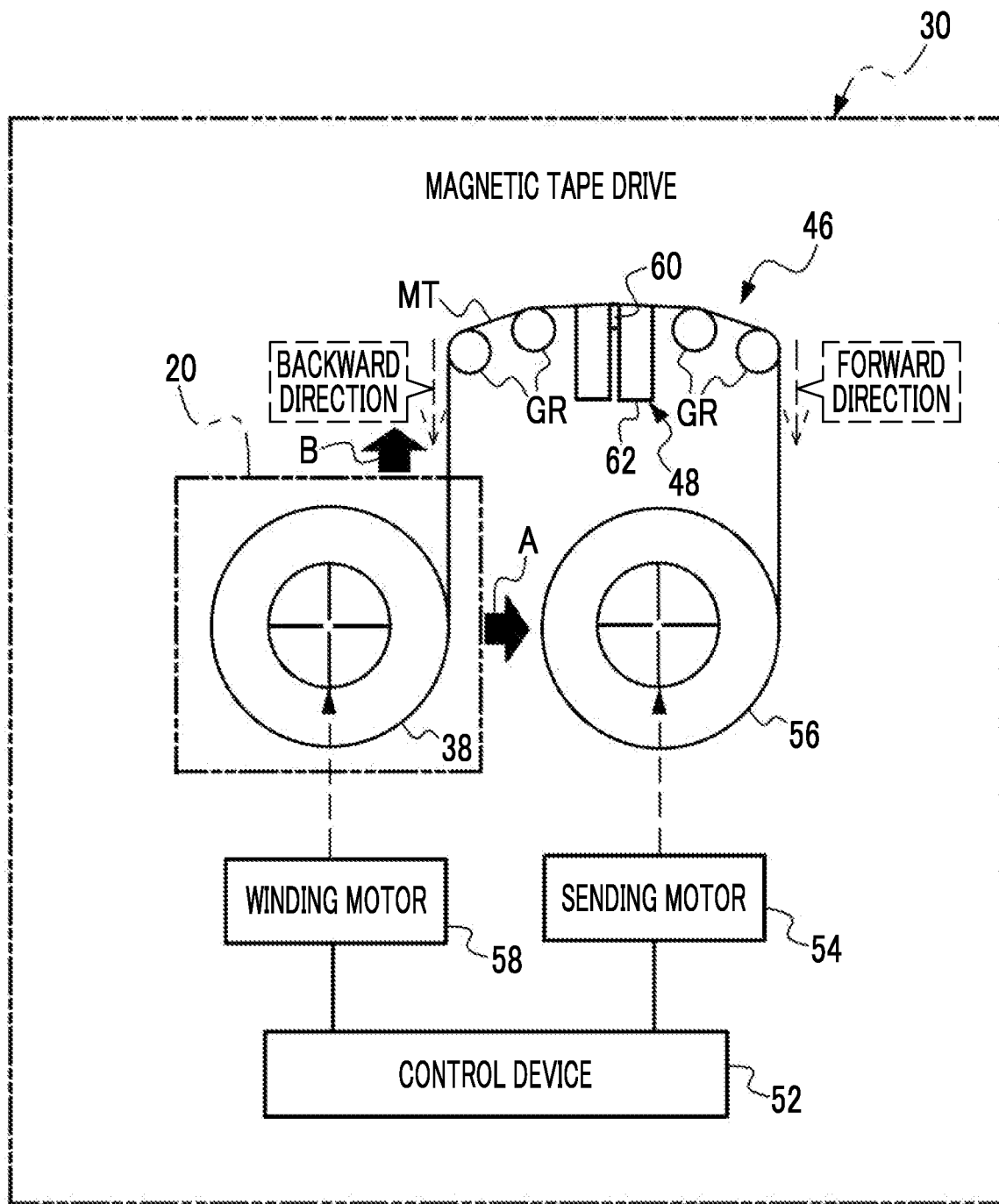
FIG. 3 is a schematic configuration diagram showing an example of a hardware configuration of a magnetic tape drive.

The magnetic tape library 12 comprises a storage rack 22 that stores a plurality of cartridges 20 (see FIG. 2) and one or more magnetic tape drives 30 (see FIG. 3). The storage rack 22 is provided with a plurality of cartridge storage cells 24, a plurality of drive storage cells 26, and a transport mechanism 28. The cartridge 20 is an example of a "cartridge" according to the technique of the present disclosure. The storage rack 22 is an example of a "container" according to the technique of the present disclosure. The cartridge storage cell 24 is an example of a "cell" according to the technique of the present disclosure, and the transport mechanism 28 is an example of a "transport mechanism" according to the technique of the present disclosure.

Each cartridge storage cell 24 has, for example, a size capable of storing one cartridge 20, and a predetermined number of cartridges 20, for example, one cartridge 20 is stored in each cartridge storage cell 24. The cartridge storage cells 24 are arranged in a lattice of, for example, 10 rows×5 columns. In the example shown in FIG. 1, although the cartridge storage cells 24 of 10 rows×5 columns are shown, this is merely an example, and it should suffice that the number of cartridge storage cells 24 is plural. Here, although a lattice-shaped arrangement is shown, this is merely an example, and other arrangement methods may be applied.

In FIG. 1, as indicated by a two-way arrow 25, a direction to the upside of the paper plane is referred to as an up direction, and a direction to the downside of the paper plane is referred to as a down direction. As indicated by a two-way arrow 27, a direction to the left of the paper plane is referred to as a left direction, and a direction to the right of the paper plane is referred to as a right direction.

In the example shown in FIG. 1, each row of the cartridge storage cell 24 is given a row number of 1 to 10 in order from the top in FIG. 1, and each column of the cartridge storage cell 24 is given a column symbol of A to E in order from the left in FIG. 1. Each cartridge storage cell 24 is given a cell name for identifying a position of the cartridge storage cell 24 using the row number and the column symbol. For example, the cartridge storage cell 24 positioned in the A column and the first row is given a cell name "A1".

In the example shown in FIG. 1, 20 cartridges 20 are stored in 20 hatched cartridge storage cells 24 of the cell numbers "A1 to B10" one by one. A new cartridge 20-1 is stored in the hatched cartridge storage cell 24 of the cell number "E10". In the example shown in FIG. 1, although the number of cartridges 20 is 20, the technique of the present disclosure is not limited thereto, and it should suffice that the number of cartridges 20 is plural. In the example shown in FIG. 1, although the number of new cartridges 20-1 is one, the technique of the present disclosure is not limited thereto, and it should suffice that the number of new cartridges 20-1 is one or more. The new cartridge 20-1 is an example of a "new cartridge" according to the technique of the present disclosure. The new cartridge 20-1 is simply referred to as the "cartridge 20" in a case where there is no need for distinction with other cartridges 20.

The magnetic tape MT that is housed in each cartridge 20 has a data storage capacity for 2.5 T (tera), for example. Accordingly, the 20 cartridges 20 can store data for a maximum of 50 T in total. In the embodiment, for example, five data files are stored in the magnetic tape MT of each of the cartridges 20 housed in the cartridge storage cells 24 of the cell numbers "A1 to B10", and 100 data files are stored in all cartridges 20. The data files are given data numbers of "0001 to 0100" (see FIG. 6).

Figure 5:
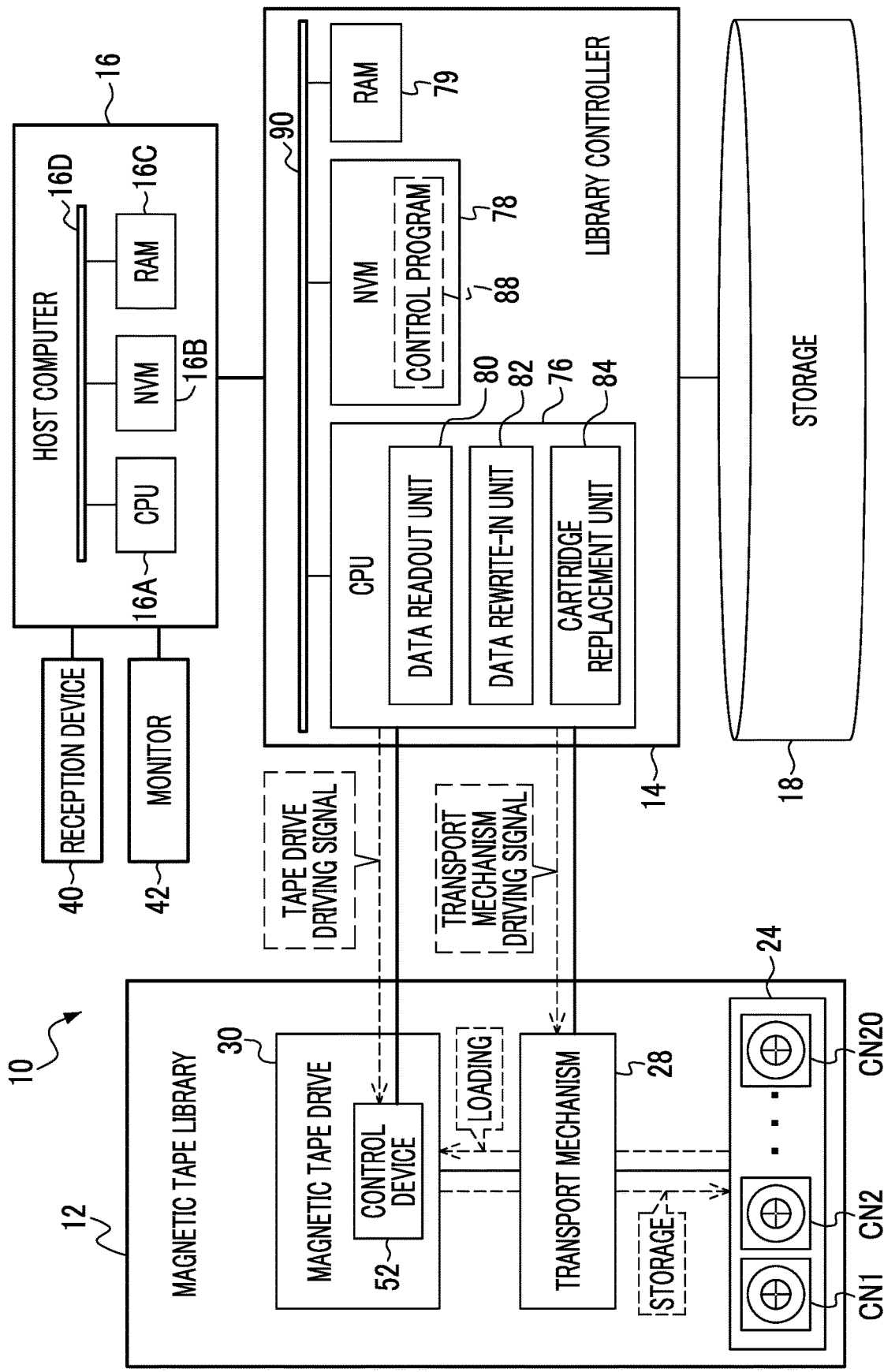
FIG. 5 is a block diagram showing an example of a configuration of the cartridge management system.

The cartridges 20 stored in the cartridge storage cells 24 of the cell numbers "A1 to B10" are given cartridge numbers of "CN1 to CN20" (see FIG. 5). The new cartridge 20-1 stored in the cartridge storage cell 24 of the cell number "E10" is given a cartridge number CN21. The new cartridge 20-1 is a non-used cartridge, and nothing is stored in the magnetic tape MT of the new cartridge 20-1.

One magnetic tape drive 30 is stored in each drive storage cell 26. In the example shown in FIG. 1, a first magnetic tape drive 30-1 is stored in the uppermost drive storage cell 26 among four drive storage cells 26 arranged in a vertical direction, and a second magnetic tape drive 30-2 is stored in a second uppermost drive storage cell 26. In the example shown in FIG. 1, although the number of drive storage cells 26 is four, the technique of the present disclosure is not limited, and the number of drive storage cells 26 may be one or more. In the following description, the first magnetic tape drive 30-1 and the second magnetic tape drive 30-2 are simply represented as a "magnetic tape drive 30" in a case where there is no need for distinction therebetween.

The cartridge 20 is loaded into the magnetic tape drive 30. The library controller 14 outputs a tape drive driving signal to the magnetic tape drive 30. The tape drive driving signal is a signal that instructs the magnetic tape drive 30 to drive. The magnetic tape drive 30 reads data from the magnetic tape MT housed in the cartridge 20 and performs write-in of data to the magnetic tape MT in response to the tape drive driving signal.

The transport mechanism 28 comprises an upper bar 28A, a lower bar 28B, a pair of horizontally movable robots 28C, a vertical bar 28D, and a vertically movable robot 28E. The upper bar 28A is fixed to an upper portion of the storage rack 22 to extend in a horizontal direction. The lower bar 28B is fixed to a lower portion of the storage rack 22 in parallel with the upper bar 28A.

A pair of horizontally movable robots 28C are attached to both ends of the vertical bar 28D. A pair of horizontally movable robots 28C is fitted to the upper bar 28A and the lower bar 28B. The horizontally movable robots 28C are self-propellable robots that can move along the horizontal direction, and move the vertical bar 28D in the horizontal direction along the upper bar 28A and the lower bar 28B while maintaining the orientation of the vertical bar 28D perpendicularly with respect to the orientations of the upper bar 28A and the lower bar 28B. The vertically movable robot 28E is attached to the vertical bar 28D. The vertically movable robot 28E is a self-propellable robot that can move along a vertical direction. That is, the vertically movable robot 28E moves in the vertical direction along the vertical bar 28D. The vertically movable robot 28E is provided with a gripping portion (not shown) for gripping the cartridge 20.

The library controller 14 outputs a transport mechanism driving signal to the transport mechanism 28. The transport mechanism driving signal is a signal that instructs the transport mechanism 28 to drive. A motor (not shown) is mounted in each of the horizontally movable robots 28C and the vertically movable robot 28E, and the motor of each of the horizontally movable robots 28C and the vertically movable robot 28E is driven in response to the transport mechanism driving signal input from the library controller 14 to generate power. In the example shown in FIG. 1, a position where a part of the vertically movable robot 28E confronts the cartridge storage cell 24 of the cell number "A1" is set as a reference position, and the horizontally movable robots 28C and the vertically movable robot 28E are self-propelled using power generated by the motors in response to the transport mechanism driving signal input from the library controller 14.

The library controller 14 is connected to the magnetic tape library 12 to be communicable through a communication cable. The library controller 14 integrally controls the transport mechanism 28 and the magnetic tape drive 30 to perform taking out of the cartridge 20 from the cartridge storage cell 24, storage of the cartridge 20 in the cartridge storage cell 24, transport of the cartridge 20, loading of the cartridge 20 into the magnetic tape drive 30, taking out of the cartridge 20 from the magnetic tape drive 30, reading of data from the magnetic tape MT housed in the cartridge 20, write-in of data to the magnetic tape MT, and the like.

The host computer 16 is connected to the library controller 14 to be communicable through a communication cable. Here, although wired communication has been illustrated, the technique of the present disclosure is not limited thereto, and wireless communication may be applied. The host computer 16 receives an instruction from a user and instructs reading of data from the magnetic tape MT housed in the cartridge 20 and write-in of data to the magnetic tape MT.

The storage 18 is connected to the library controller 14 to be communicable through a communication cable. A data table 32 and a cartridge table 34 stored in the storage 18.

The library controller 14 searches for a specific cartridge 20 (for example, the cartridge 20 to be a reading and writing target of data) from among a plurality of cartridges 20, causes the transport mechanism 28 to take out the specific cartridge 20 from the cartridge storage cell 24, or causes the magnetic tape drive 30 to read and write data from and to the magnetic tape MT in the specific cartridge 20 under the control of the host computer 16.

As shown in FIG. 2 as an example, the magnetic tape MT that stores data is housed in the cartridge 20. In the following description, for convenience of description, in FIG. 2, a loading direction of the cartridge 20 into the magnetic tape drive 30 (see FIG. 3) is indicated by an arrow A, an arrow A direction is referred to as a front direction of the cartridge 20, and a side in the front direction of the cartridge 20 is referred to as a front side of the cartridge 20. A direction opposite to the front direction of the cartridge 20 is referred to as a rear direction of the cartridge 20, and a side in the rear direction of the cartridge 20 is referred to as a rear side of the cartridge 20.

In the following direction, for convenience of description, in FIG. 2, an arrow B direction perpendicular to the arrow A direction is referred to as a right direction, and a side in the right direction of the cartridge 20 is referred to as a right side of the cartridge 20. A direction opposite to the right direction of the cartridge 20 is referred to as a left direction of the cartridge 20, and a side in the left direction of the cartridge 20 is referred to as a left side of the cartridge 20.

In the following description, for convenience of description, in FIG. 2, a direction perpendicular to the arrow A direction and the arrow B direction is indicated by an arrow C, an arrow C direction is referred to as an up direction of the cartridge 20, and a side in the up direction of the cartridge 20 is referred to as an upside of the cartridge 20. A direction opposite to the up direction of the cartridge 20 is referred to as a down direction of the cartridge 20, and a side in the down direction of the cartridge 20 is referred to as a downside of the cartridge 20.

As shown in FIG. 2 as an example, the cartridge 20 has a substantially rectangular shape in plan view, and comprises a box-shape case 36. The case 36 is formed of resin, such as polycarbonate, and comprises an upper case 36A and a lower case 36B. The upper case 36A and the lower case 36B are bonded by welding (for example, ultrasonic welding) and screwing in a state in which a lower peripheral edge surface of the upper case 36A and an upper peripheral edge surface of the lower case 36B are brought into contact with each other. A bonding method is not limited to welding and screwing, and other bonding methods may be used.

Inside the case 36, a cartridge reel 38 is rotatably housed. The cartridge reel 38 comprises a reel hub 38A, an upper flange 38B1, and a lower flange 38B2. The reel hub 38A is formed in a cylindrical shape. The reel hub 38A is a shaft center portion of the cartridge reel 38, has a shaft center direction along an up-down direction of the case 36, and is disposed in a center portion of the case 36. Each of the upper flange 38B1 and the lower flange 38B2 is formed in an annular shape. A center portion in plan view of the upper flange 38B1 is fixed to an upper end portion of the reel hub 38A, and a center portion in plan view of the lower flange 38B2 is fixed to a lower end portion of the reel hub 38A. The magnetic tape MT is wound around an outer peripheral surface of the reel hub 38A, and an end portion in a width direction of the magnetic tape MT is held by the upper flange 38B1 and the lower flange 38B2.

An opening 36D is formed on a front side of a right wall 36C of the case 36. The magnetic tape MT is pulled out from the opening 36D.

As shown in FIG. 3 as an example, the magnetic tape drive 30 comprises a transport device 46, a reading and writing head 48, and a control device 52. The cartridge 20 is loaded into the magnetic tape drive 30. The magnetic tape drive 30 is a device that pulls out the magnetic tape MT from the cartridge 20, and reads data from the pulled-out magnetic tape MT and writes data to the magnetic tape MT using the reading and writing head 48.

The control device 52 controls the operation of the entire magnetic tape drive 30. In the embodiment, although the control device 52 is realized by an ASIC, the technique of the present disclosure is not limited thereto. For example, the control device 52 may be realized by an FPGA. Alternatively, the control device 52 may be realized by a computer including a CPU, a ROM, and a RAM. In addition, the control device 52 may be realized by combining two or more of an ASIC, an FPGA, and a computer. That is, the control device 52 may be realized by a combination of a hardware configuration and a software configuration.

The transport device 46 is a device that selectively transports the magnetic tape MT in a forward direction and a backward direction, and comprises a sending motor 54, a sending reel 56, a winding motor 58, and a plurality of guide rollers GR.

The sending motor 54 rotates the sending reel 56 under the control of the control device 52. The control device 52 controls the sending motor 54 to control a rotation direction, a rotation speed, rotation torque, and the like of the sending reel 56.

In a case where the magnetic tape MT is pulled out to the sending reel 56, the control device 52 rotates the sending motor 54 such that the magnetic tape MT runs in the forward direction. A rotation speed, rotation torque, and the like of the sending motor 54 are adjusted depending on a speed of the magnetic tape MT that is pulled out to the sending reel 56.

The winding motor 58 rotationally drives the cartridge reel 38 in the cartridge 20 under the control of the control device 52. The control device 52 controls the winding motor 58 to control a rotation direction, a rotation speed, rotation torque, and the like of the cartridge reel 38.

In a case where the magnetic tape MT is wound around the cartridge reel 38, the control device 52 rotates the winding motor 58 such that the magnetic tape MT runs in the backward direction. A rotation speed, rotation torque, and the like of the winding motor 58 are adjusted depending on a speed of the magnetic tape MT that is wound around the cartridge reel 38.

The rotation speed, the rotation torque, and the like of each of the sending motor 54 and the winding motor 58 are adjusted in this manner, such that tension in a predetermined range is applied to the magnetic tape MT. Here, the predetermined range indicates, for example, a range of tension obtained by a computer simulation and/or a test with a real machine as a range of tension in which data can be read from the magnetic tape MT and data can be written in the magnetic tape MT by the reading and writing head 48.

In the embodiment, although the rotation speed, the rotation torque, and the like of each of the sending motor 54 and the winding motor 58 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading and writing head 48 between the cartridge 20 and the sending reel 56.

The reading and writing head 48 comprises a reading and writing element 60 and a holder 62. The reading and writing element 60 is held by the holder 62 to be brought into contact with the running magnetic tape MT and performs reading of data from the magnetic tape MT that is transported by the transport device 46 and write-in of data to the magnetic tape MT.

The cartridge management system 10 is a system that manages a plurality of cartridges 20, in each of which the magnetic tape MT is housed. The library controller 14 controls the cartridge management system 10 following a flow of processing shown in FIG. 4, for example.

Figure 4:
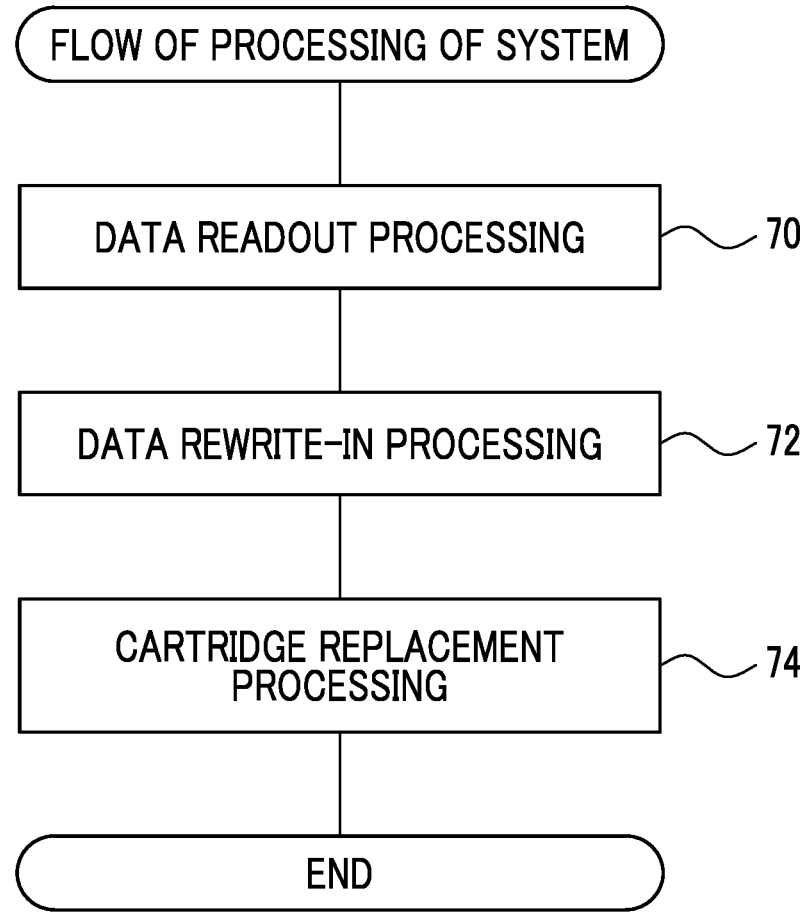
FIG. 4 is a flowchart illustrating an example of a flow of processing of the cartridge management system.

As shown in FIG. 4 as an example, the cartridge management system 10 executes data readout processing 70, data rewrite-in processing 72, and cartridge replacement processing 74 following control by the library controller 14. The data readout processing 70 is processing of reading out data from the magnetic tape MT housed in the cartridge 20 in response to a readout request signal received from the host computer 16. The data rewrite-in processing 72 is processing of rewriting data stored in the magnetic tape MT in the specific cartridge 20 based on an access frequency indicating a frequency of access to data. The cartridge replacement processing 74 is processing of replacing data stored in the magnetic tape MT of the specific cartridge 20 and data stored in the magnetic tape MT of another cartridge 20.

A configuration of the cartridge management system 10 that executes the data readout processing 70, the data rewrite-in processing 72, and the cartridge replacement processing 74 will be described below.

As shown in FIG. 5 as an example, the library controller 14 comprises a CPU 76, an NVM 78, and a RAM 79. The CPU 76, the NVM 78, and the RAM 79 are connected to a bus 90.

The CPU 76 is an example of a "processor" according to the technique of the present disclosure. The CPU 76 controls the entire cartridge management system 10. The NVM 78 is an example of a "memory" according to the technique of the present disclosure. An example of the NVM 78 is an EEPROM. The EEPROM is merely an example, and for example, a ferroelectric memory may be used instead of the EEPROM. Any non-volatile memory may be used as long as such a memory can be mounted in the library controller 14. The RAM 79 is a volatile memory that is used as a work area or the like at the time of execution of various programs.

The CPU 76 outputs the transport mechanism driving signal. The transport mechanism 28 moves the horizontally movable robot 28C and the vertically movable robot 28E in response to the transport mechanism driving signal input from the CPU 76, thereby selectively performing a loading operation to take out the cartridge 20 from the cartridge storage cell 24 and to load the taken-out cartridge 20 into the magnetic tape drive 30 and a storage operation to take out the cartridge 20 from the magnetic tape drive 30 and to store the taken-out cartridge 20 in the cartridge storage cell 24. In a case where the drive of the transport mechanism 28 based on the transport mechanism driving signal ends, the transport mechanism 28 returns to the reference position again.

The CPU 76 outputs the tape drive driving signal. The control device 52 of the magnetic tape drive 30 controls the transport device 46 and the reading and writing head 48 in response to the tape drive driving signal input from the CPU 76, thereby selectively performing a readout operation to read out data from the magnetic tape MT and a write-in operation to write data in the magnetic tape MT.

A control program 88 is stored in the NVM 78. The CPU 76 reads out the control program 88 from the NVM 78 and executes the control program 88 on the RAM 79 to operate as a data readout unit 80, a data rewrite-in unit 82, and a cartridge replacement unit 84. The data readout unit 80 executes the data readout processing 70. The data rewrite-in unit 82 executes the data rewrite-in processing 72. The cartridge replacement unit 84 executes the cartridge replacement processing 74.

The host computer 16 gives an instruction depending on a user's request to the library controller 14. The host computer 16 comprises a CPU 16A, an NVM 16B, and a RAM 16C. The CPU 16A controls the entire host computer 16. The NVM 16B is a non-volatile memory. Various programs are stored in the NVM 16B. An example of the NVM 16B is an EEPROM, but the technique of the present disclosure is not limited thereto. The NVM 16B may be, for example, a ferroelectric memory instead of the EEPROM. Any non-volatile memory may be used as long as such a memory can be mounted in the host computer 16. The RAM 16C is a volatile memory that is used as a work area or the like at the time of execution of various programs.

The CPU 16A, the NVM 16B, and the RAM 16C are connected to a bus 16D. For example, a reception device 40 including, for example, a mouse, a keyboard, and a touch panel, and a monitor 42 including, for example, an EL display or an LCD, is connected to the host computer 16. The reception device 40 receives an instruction from the user with respect to the host computer 16. The monitor 42 displays an output from the host computer 16 on a screen. Here, although the reception device 40 and the monitor 42 are shown as independent devices, the technique of the present disclosure is not limited thereto, and an input/output device in which the reception device 40 and the monitor 42 are integrated may be applied. Examples of the input/output device include a touch panel included in the reception device 40 and a touch panel display in which the monitor 42 is integrated.

Figure 6:
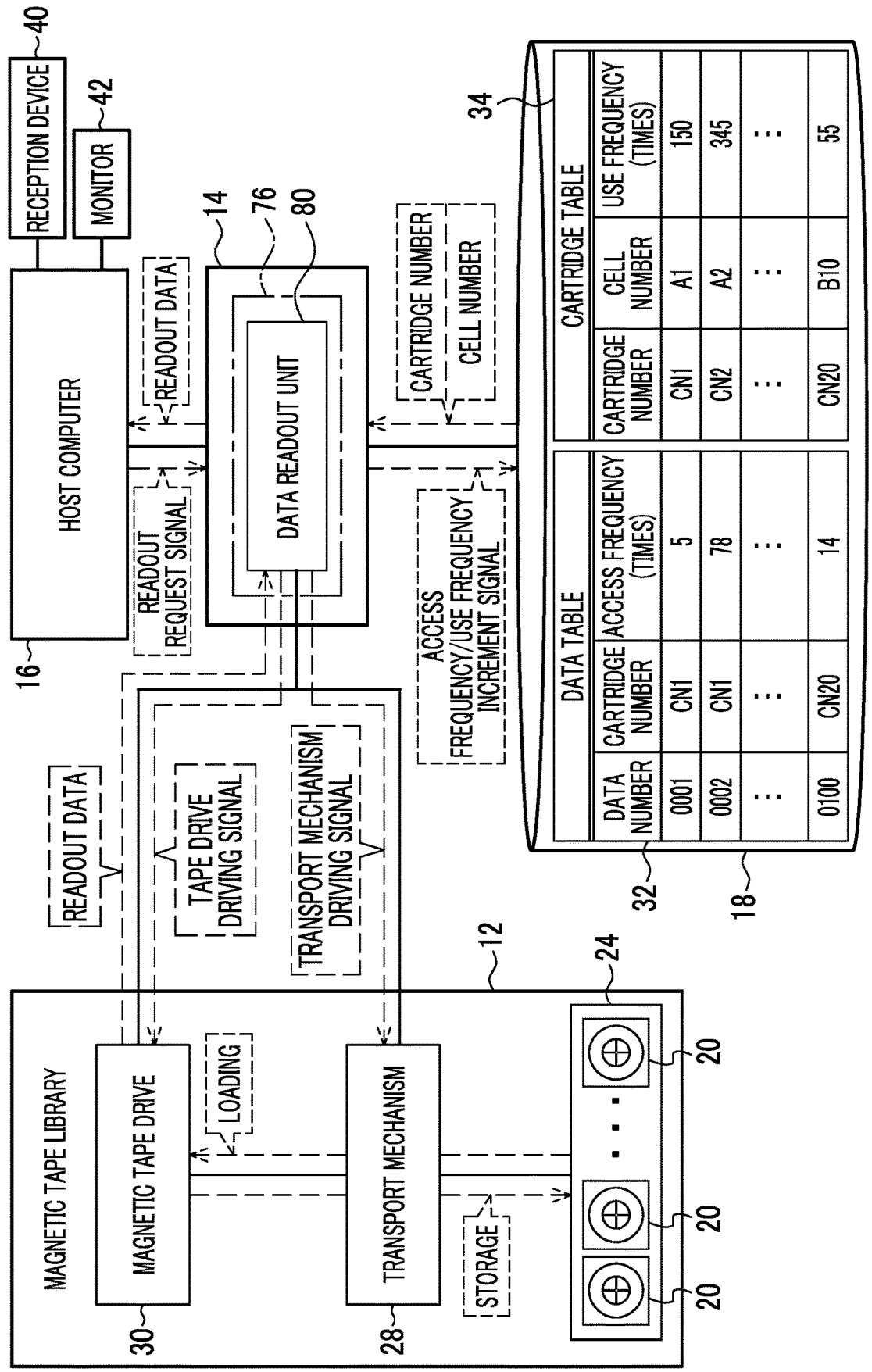
FIG. 6 is a block diagram showing an example of processing contents by a data readout unit.

As shown in FIG. 6 as an example, the data readout unit 80 executes the data readout processing 70 in response to the readout request signal input from the host computer 16. The readout request signal is output by the host computer 16 in response to a readout instruction signal from the user received through the reception device 40. The readout instruction signal includes a data number capable of specifying data (hereinafter, referred to as "readout target data") designated as a readout target by the user. The host computer 16 creates the readout request signal including the data number of the readout target data and outputs the readout request signal to the data readout unit 80.

A data table 32 and a cartridge table 34 stored in the storage 18. In the data table 32, a data number of data stored in the cartridge 20 and a cartridge number of the cartridge 20 that stores data are stored in association with each other. In the cartridge table 34, the cartridge number of the cartridge 20 and a cell number of the cartridge storage cell 24 that stores the cartridge 20 are stored in association with each other.

The data readout unit 80 searches for the cartridge number corresponding to the data number of the readout target data with reference to the data table 32 stored in the storage 18. That is, the data readout unit 80 acquires the cartridge number of the cartridge 20 where the readout target data is stored. Thereafter, the data readout unit 80 searches for the cell number corresponding to the searched cartridge number with reference to the cartridge table 34. That is, the data readout unit 80 acquires the cell number of the cartridge storage cell 24 that stores the cartridge 20 where the readout target data is stored.

The data readout unit 80 outputs the transport mechanism driving signal to the transport mechanism 28. The transport mechanism 28 performs the loading operation in response to the transport mechanism driving signal input from the data readout unit 80. With this, the cartridge 20 where the readout target data is stored is taken out from the cartridge storage cell 24 and is loaded into the magnetic tape drive 30 by the transport mechanism 28.

The data readout unit 80 outputs the tape drive driving signal to the magnetic tape drive 30. The magnetic tape drive 30 performs the readout operation in response to the tape drive driving signal input from the data readout unit 80. With this, the readout target data is read out from the cartridge 20. The read-out data (hereinafter, also referred to as "readout data") is output to the host computer 16.

In the data table 32, in addition to the association of the data number and the cartridge number, an access frequency indicating a frequency of access to data having each data number is stored. The data number, the cartridge number, and the access frequency are stored in the data table 32 in association with one another. Here, the access frequency indicates, for example, the number of times in which data having each data number is read in a specific period by the readout operation by the magnetic tape drive 30. The specific period is, for example, one month, and the access frequency shown in data table 32 is reset to zero every month.

The data readout unit 80 increments the access frequency corresponding to the data number of the readout data by one in the data table 32 by outputting an access frequency increment signal after the end of the readout operation by the magnetic tape drive 30.

In the cartridge table 34, in addition to the association of the cartridge number and the cell number, a use frequency indicating a frequency of use of the cartridge 20 having each cartridge number is stored. The cartridge number, the cell number, and the use frequency are stored in the cartridge table 34 in association with one another. Here, the use frequency indicates, for example, the number of times in which the cartridge 20 having each cartridge number is used in the readout operation by the magnetic tape drive 30 in a period from a start of use of each cartridge 20 to the present.

The data readout unit 80 increments the use frequency corresponding to the cartridge number of the cartridge 20 that stores the readout data, by one in the cartridge table 34 by outputting the use frequency increment signal after the end of the readout operation by the magnetic tape drive 30.

In a case where the readout operation by the magnetic tape drive 30 ends, the data readout unit 80 causes the transport mechanism 28 to perform the storage operation by outputting the transport mechanism driving signal to the transport mechanism 28. With this, the cartridge 20 loaded into the magnetic tape drive 30 is taken out from the magnetic tape drive 30 and is stored in the original cartridge storage cell 24.

Specifically, for example, in a case where a readout request signal for reading out data of the data number "0001" is received, the data readout unit 80 acquires the cartridge number "CN1" corresponding to the data number "0001" with reference to the data table 32. Next, the data readout unit 80 acquires the cell number "A1" corresponding to the cartridge number "CN1" with reference to the cartridge table 34.

The data readout unit 80 drives the transport mechanism 28 to take out the cartridge 20 of the cartridge number "CN1" from the cartridge storage cell 24 of the cell number "A1" and to load the cartridge 20 into the magnetic tape drive 30 by outputting the transport mechanism driving signal. The data readout unit 80 drives the magnetic tape drive 30 to read out data of the data number "0001" from the cartridge 20 of the cartridge number "CN1" loaded into the magnetic tape drive 30 by outputting the tape drive driving signal. In a case where the readout operation by the magnetic tape drive 30 ends, the data readout unit 80 drives the transport mechanism 28 to take out the cartridge 20 of the cartridge number "CN1" from the magnetic tape drive 30 and to store the cartridge 20 in the cartridge storage cell 24 of the cell number "A1" by outputting the transport mechanism driving signal.

Figure 7:
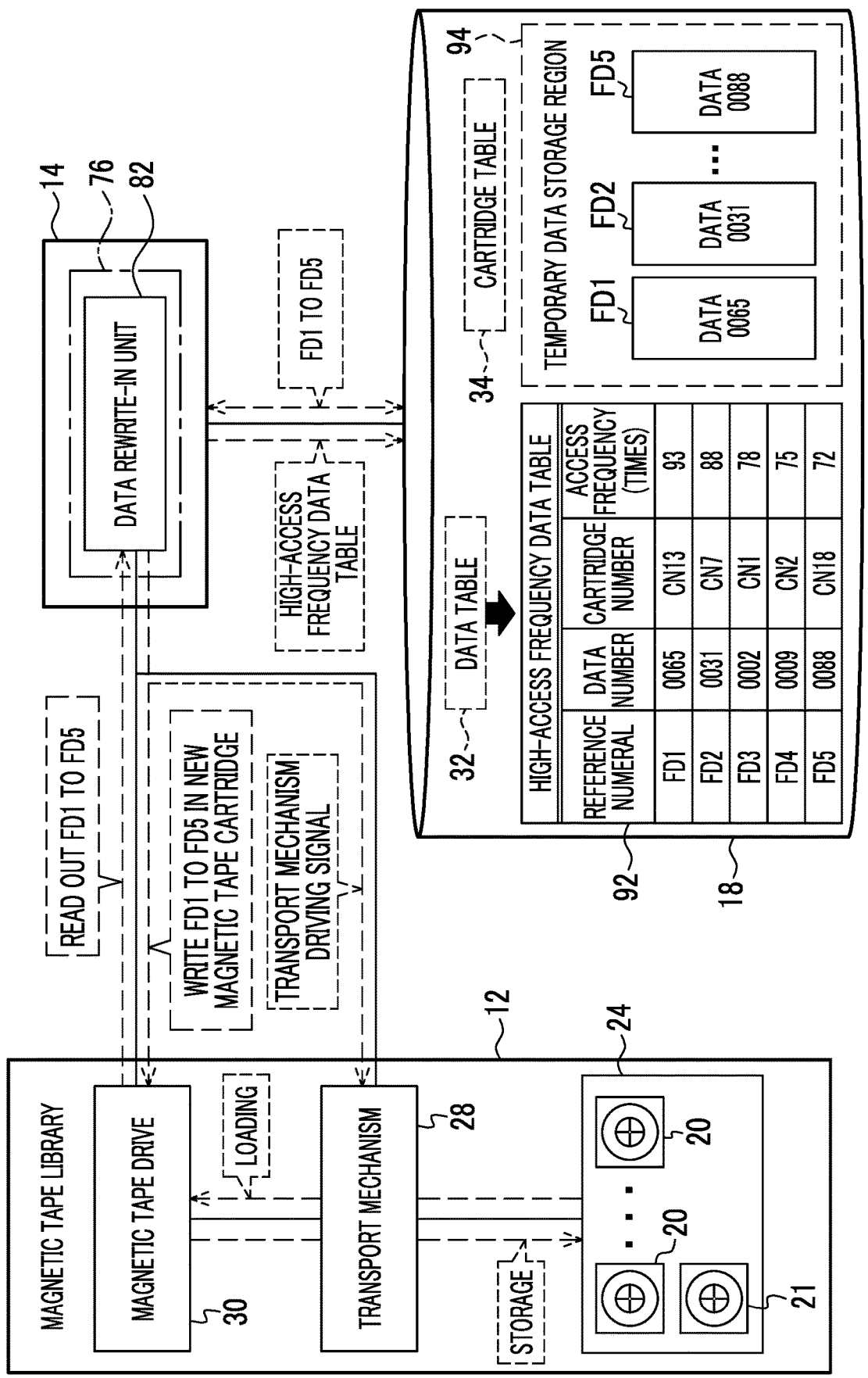
FIG. 7 is a block diagram showing an example of processing contents by a data rewrite-in unit.

As shown in FIG. 7 as an example, the data rewrite-in unit 82 executes the data rewrite-in processing 72. In the data rewrite-in processing 72, the data rewrite-in unit 82 rewrites high-access frequency data that is data having an access frequency higher than a reference access frequency, in a specific cartridge to aggregate the high-access frequency data in the specific cartridge.

Here, the high-access frequency data indicates, for example, top 5% of data having a high access frequency in a case where data files are arranged in a descending order of the access frequency. The reference access frequency indicates a value obtained by subtracting one from the access frequency of data having the lowest access frequency among data designated as the high-access frequency data. Note that the technique of the present disclosure is not limited thereto, and for example, high-access frequency data may be top 10% of data having a high access frequency. A proportion of the high-access frequency data in all the data can be optionally changed. In the embodiment, the specific cartridge is, for example, the new cartridge 20-1.

The data rewrite-in processing 72 is executed by the data rewrite-in unit 82 at regular intervals, for example, once a month in a case where an execution instruction (hereinafter, referred to as a "data rewrite-in processing execution instruction") of the data rewrite-in processing 72 is output from a timer (not shown) provided in the library controller 14.

In a case where the data rewrite-in processing execution instruction is received, the data rewrite-in unit 82 reads out the data table 32 from the storage 18 and creates a high-access frequency data table 92 from the data table 32. As shown in FIG. 8 as an example, in the high-access frequency data table 92, data files described in the data table 32 are rearranged based on the access frequency, and top 5% of data files, that is, five data files among 100 data files in a descending order of the access frequency are extracted as high-access frequency data. In the high-access frequency data table 92, the high-access frequency data is given reference numerals FD1 to FD5 in a descending order of the access frequency.

The data rewrite-in unit 82 stores the created high-access frequency data table 92 in the storage 18. The data rewrite-in unit 82 sequentially reads out the high-access frequency data FD1 to FD5 from the cartridge 20 with reference to the high-access frequency data table 92 and the cartridge table 34 and stores the high-access frequency data FD1 to FD5 in a temporary data storage region 94.

More specifically, the data rewrite-in unit 82 acquires the data number "0065" and the cartridge number "CN13" corresponding to the high-access frequency data FD1 with reference to the high-access frequency data table 92. Next, the data rewrite-in unit 82 acquires the cell number "B3" corresponding to the cartridge number "CN13" with reference to the cartridge table 34.

The data rewrite-in unit 82 drives the transport mechanism 28 to take out the cartridge 20 of the cartridge number "CN13" from the cartridge storage cell 24 of the cell number "B3" and to load the cartridge 20 into the magnetic tape drive 30 by outputting the transport mechanism driving signal. Next, the data rewrite-in unit 82 drives the magnetic tape drive 30 to read out data of the data number "0065" from the cartridge 20 of the cartridge number "CN13" by outputting the tape drive driving signal. The read-out data of the data number "0065" is stored in the temporary data storage region 94. In a case where the readout operation by the magnetic tape drive 30 ends, the data rewrite-in unit 82 drives the transport mechanism 28 to take out the cartridge 20 of the cartridge number "CN13" from the magnetic tape drive 30 and to store the cartridge 20 in the cartridge storage cell 24 of the cell number "B3" by outputting the transport mechanism driving signal.

The data rewrite-in unit 82 stores the high-access frequency data FD2 to FD5 in the temporary data storage region 94 by repeating the same processing. In a case where all the high-access frequency data FD1 to FD5 are stored in the temporary data storage region 94, the data rewrite-in unit 82 drives the transport mechanism 28 to load the new cartridge 20-1 into the magnetic tape drive 30 by outputting the transport mechanism driving signal.

The data rewrite-in unit 82 drives the magnetic tape drive 30 to write the high-access frequency data FD1 to FD5 stored in the temporary data storage region 94 in the new cartridge 20-1 by outputting the tape drive driving signal.

In a case where the write-in operation by the magnetic tape drive 30 ends, the data rewrite-in unit 82 changes the cartridge number of data designated as the high-access frequency data FD1 to FD5 to "CN21" indicating the new cartridge 20-1 in the data table 32.

Figure 9:
FIG. 9 is an explanatory view showing an example of a changed place of the data table in data rewrite-in processing.

As shown in FIG. 9 as an example, in a data table 32-1 before the data rewrite-in processing, the cartridge number corresponding to the data number "0002" is "CN1". Since the data of the data number "0002" is the high-access frequency data FD3, the data rewrite-in unit 82 changes the cartridge number corresponding to the data number "0002" to "CN21". With this, in the data readout processing 70, the high-access frequency data FD1 to FD5 are read out from the new cartridge 20-1, not from the cartridge 20. Accordingly, in the data readout processing 70, the new cartridge 20-1 where the high-access frequency data FD1 to FD5 are aggregated is intensively used, and a use frequency of the new cartridge 20-1 increases.

The data rewrite-in unit 82 resets the access frequencies of all the data to zero in a data table 32-2 after data rewrite-in processing. Accordingly, each time the data rewrite-in processing 72 is executed, the access frequencies shown in the data table 32 are reset.

The data rewrite-in unit 82 adds the new cartridge 20-1 to the cartridge table 34. The data rewrite-in unit 82 rewrites the cartridge table 34 such that the new cartridge 20-1 is stored in the cartridge storage cell 24 having a shortest transport path from the cartridge storage cell 24 to the magnetic tape drive 30 by the transport mechanism 28.

Figure 10:
FIG. 10 is an explanatory view showing an example of a changed place of a cartridge table in the data rewrite-in processing.

For example, in FIG. 10, a reference numeral 34-1 indicates a cartridge table before the data rewrite-in processing, and a reference numeral 34-2 indicates a cartridge table after the data rewrite-in processing. In a cartridge table 34-2, the cartridge number "CN21" of the new cartridge 20-1 is added, and the cell number "A1" is stored corresponding to the cartridge number "CN21". The reason is because, as shown in FIG. 1, since the cartridge storage cell 24 of the cell number "A1" is closest to the magnetic tape drive 30 and is closest to the reference position of the transport mechanism 28, in a case of transporting the cartridge 20 between the cartridge storage cell 24 of the cell number "A1" and the magnetic tape drive 30, the transport path of the transport mechanism 28 is the shortest.

In this case, before the data rewrite-in processing, the cartridge 20 of the cartridge number "CN1" stored in the cartridge storage cell 24 of the cell number "A1" is moved to another cartridge storage cell 24. In the example shown in FIG. 10, as shown in the cartridge table 34-2, the cell number corresponding to the cartridge number "CN1" is changed to "C1".

The data rewrite-in unit 82 moves the cartridge 20 of the cartridge number "CN1" stored in the cartridge storage cell 24 of the cell number "A1" to the cartridge storage cell 24 of the cell number "C1" by outputting the transport mechanism driving signal following the cartridge table 34-2. Thereafter, the data rewrite-in unit 82 takes out the new cartridge 20-1 from the magnetic tape drive 30 and stores the new cartridge 20-1 in the cartridge storage cell 24 of the cell number "A1" by outputting the transport mechanism driving signal. Accordingly, since the new cartridge 20-1 is stored in the cartridge storage cell 24 having the shortest transport path by the transport mechanism 28, the transport mechanism 28 can quickly transport the new cartridge 20-1 having a high use frequency between the cartridge storage cell 24 and the magnetic tape drive 30.

Figure 11:
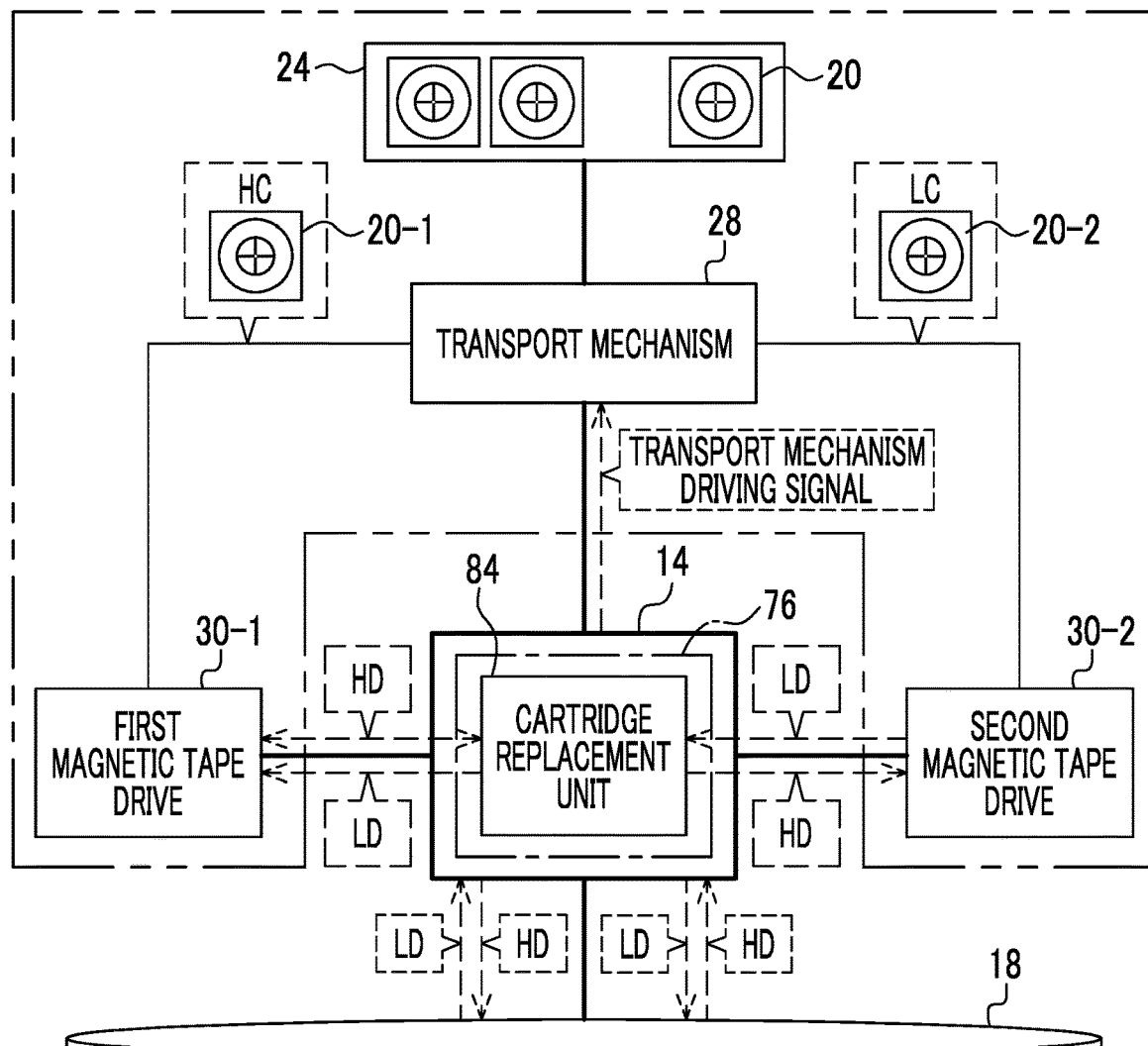
FIG. 11 is a block diagram showing an example of processing contents by a cartridge replacement unit.

As shown in FIG. 11 as an example, the cartridge replacement unit 84 executes the cartridge replacement processing 74. The cartridge replacement processing 74 replaces data stored in the new cartridge 20-1 with data of another cartridge having a low use frequency to equalize a consumption rate of each cartridge 20 among a plurality of cartridges 20.

Here, another cartridge is a cartridge having a use frequency lower than a reference use frequency among the cartridges 20. In the embodiment, for example, in a case where the cartridges 20 are arranged in a descending order of the use frequency, the cartridge replacement unit 84 executes the cartridge replacement processing 74 using one cartridge 20 having a lowest use frequency among bottom 5% of cartridges 20 having a low use frequency, that is, 20 cartridges 20. In this case, a value obtained by adding one to the use frequency of the cartridge 20 having the lowest use frequency is the reference use frequency. Note that the technique of the present disclosure is not limited thereto and the reference use frequency can be optionally changed. The reference use frequency is an example of a "first reference use frequency" according to the technique of the present disclosure.

The cartridge replacement processing 74 is executed by the cartridge replacement unit 84 at regular intervals, for example, once a year in a case where an execution instruction (hereinafter, referred to as a "cartridge replacement processing execution instruction") of the cartridge replacement processing 74 is output from a timepiece (not shown) provided in the library controller 14.

In a case where the cartridge replacement processing execution instruction is received, the cartridge replacement unit 84 searches for a highest-use frequency cartridge (in FIG. 11, indicated by an abbreviation "HC") and a lowest-use frequency cartridge (in FIG. 11, indicated by an abbreviation "LC") with reference to the cartridge table 34 of the storage 18. In the embodiment, as shown in the cartridge table 34 of FIG. 11, the new cartridge 20-1 of the cartridge number "CN21" is a highest-use frequency cartridge, and a cartridge 20-2 of the cartridge number "CN7" is a lowest-use frequency cartridge.

The cartridge replacement unit 84 drives the transport mechanism 28 to take out the highest-use frequency cartridge 20-1 from the cartridge storage cell 24 and to load the highest-use frequency cartridge 20-1 into the first magnetic tape drive 30-1 by outputting the transport mechanism driving signal. The cartridge replacement unit 84 drives the transport mechanism 28 to take out the lowest-use frequency cartridge 20-2 from the cartridge storage cell 24 and to load the lowest-use frequency cartridge 20-2 into the second magnetic tape drive 30-2 by outputting the transport mechanism driving signal.

The cartridge replacement unit 84 drives the magnetic tape drive 30 to read out data (hereinafter, referred to as "highest-use frequency data", and in FIG. 11, indicated by an abbreviation "HD") from the highest-use frequency cartridge 20-1 by outputting the tape drive driving signal. The cartridge replacement unit 84 drives the magnetic tape drive 30 to read out data (hereinafter, referred to as "lowest-use frequency data", and in FIG. 11, indicated by an abbreviation "LD") from the lowest-use frequency cartridge 20-2 by outputting the tape drive driving signal. The read-out highest-use frequency data and lowest-use frequency data are stored in the temporary data storage region 94 of the storage 18.

The cartridge replacement unit 84 drives the magnetic tape drive 30 to write the highest-use frequency data stored in the temporary data storage region 94, in the lowest-use frequency cartridge 20-2 by outputting the tape drive driving signal. The cartridge replacement unit 84 drives the magnetic tape drive 30 to write the lowest-use frequency data stored in the temporary data storage region 94, in the highest-use frequency cartridge 20-1 by outputting the tape drive driving signal. With this, data of the highest-use frequency cartridge and data of the lowest-use frequency cartridge are replaced.

In a case where the write-in operation by the magnetic tape drive 30 ends, the cartridge replacement unit 84 replaces the cell number of the highest-use frequency cartridge 20-1 and the cell number of the lowest-use frequency cartridge 20-2 in the cartridge table 34.

As shown in FIG. 12 as an example, in a cartridge table 34-3 before the cartridge replacement processing, the cell number corresponding to the cartridge number "CN21" is "A1", and the cell number corresponding to the cartridge number "CN7" is "A7". The cartridge replacement unit 84 changes the cell number corresponding to the cartridge number "CN21" to "A7" and changes the cell number corresponding to the cartridge number "CN7" to "A1" as shown in a cartridge table 34-4 after the cartridge replacement processing. With this, the cartridge (lowest-use frequency cartridge 20-2) where the high-access frequency data FD1 to FD5 are stored is stored in the cartridge storage cell 24 having the shortest transport path by the transport mechanism 28.

The cartridge replacement unit 84 replaces the cartridge number corresponding to data stored in the highest-use frequency cartridge 20-1 and the cartridge number corresponding to data stored in the lowest-use frequency cartridge 20-2, in the data table 32.

As shown in FIG. 13 as an example, in a data table 32-3 before the cartridge replacement processing, the cartridge number corresponding to the data number "0002" is "CN21". The cell number corresponding to the data numbers "0031" and "0032" is "CN7". The cartridge replacement unit 84 changes the cartridge number corresponding to the data number "0002" to "CN7" and changes the cartridge number corresponding to the data numbers "0031" and "0032" to "CN21" as shown in a data table 32-4 after the cartridge replacement processing. With this, matching of the data number and the cartridge number is taken.

The operations of the cartridge management system 10 according to the embodiment will be described referring to FIGS. 14 to 16.

Figure 14:
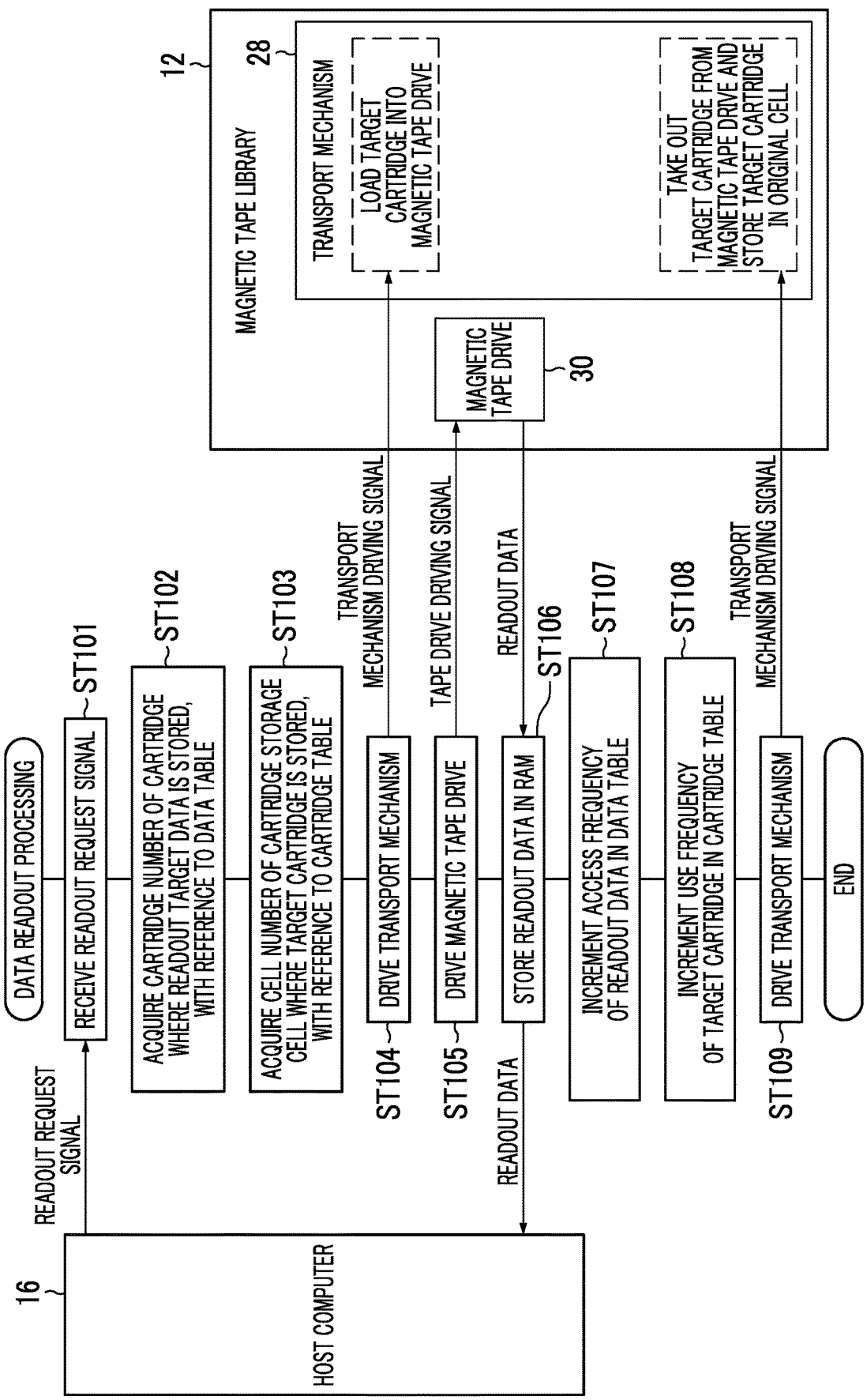
FIG. 14 is a flowchart illustrating an example of a flow of data readout processing.

FIG. 14 shows an example of a flow of the data readout processing 70 that is executed in a case where the library controller 14 is powered on.

In the data readout processing 70 shown in FIG. 14, first, in Step ST101, the data readout unit 80 receives the readout request signal from the host computer 16. Thereafter, the data readout processing proceeds to Step ST102.

In Step ST102, the data readout unit 80 acquires the cartridge number of the cartridge 20 (hereinafter, also referred to as a "target cartridge") that stores the readout target data, with reference to the data table 32. Thereafter, the data readout processing 70 proceeds to Step ST103.

In Step ST103, the data readout unit 80 acquires the cell number of the cartridge storage cell 24 that stores the target cartridge, with reference to the cartridge table 34. Thereafter, the data readout processing 70 proceeds to Step ST104.

In Step ST104, the data readout unit 80 causes the transport mechanism 28 to load the target cartridge into the magnetic tape drive 30. Thereafter, the data readout processing 70 proceeds to Step ST105.

In Step ST105, the data readout unit 80 causes the magnetic tape drive 30 to read out the readout target data from the magnetic tape MT of the target cartridge. Thereafter, the data readout processing 70 proceeds to Step ST106.

In Step ST106, the data readout unit 80 stores the readout data in the RAM 79. The readout data stored in the RAM 79 is output to the host computer 16. Thereafter, the data readout processing 70 proceeds to Step ST107.

In Step ST107, the data readout unit 80 increments the access frequency of the readout data in the data table 32. Thereafter, the data readout processing 70 proceeds to Step ST108.

In Step ST108, the data readout unit 80 increments the use frequency of the target cartridge in the cartridge table 34. Thereafter, the data readout processing 70 proceeds to Step ST109.

In Step ST109, the data readout unit 80 causes the transport mechanism 28 to take out the target cartridge from the magnetic tape drive 30 and to store the target cartridge in the original cartridge storage cell 24. With this, the data readout unit 80 ends the data readout processing 70.

Figure 15:
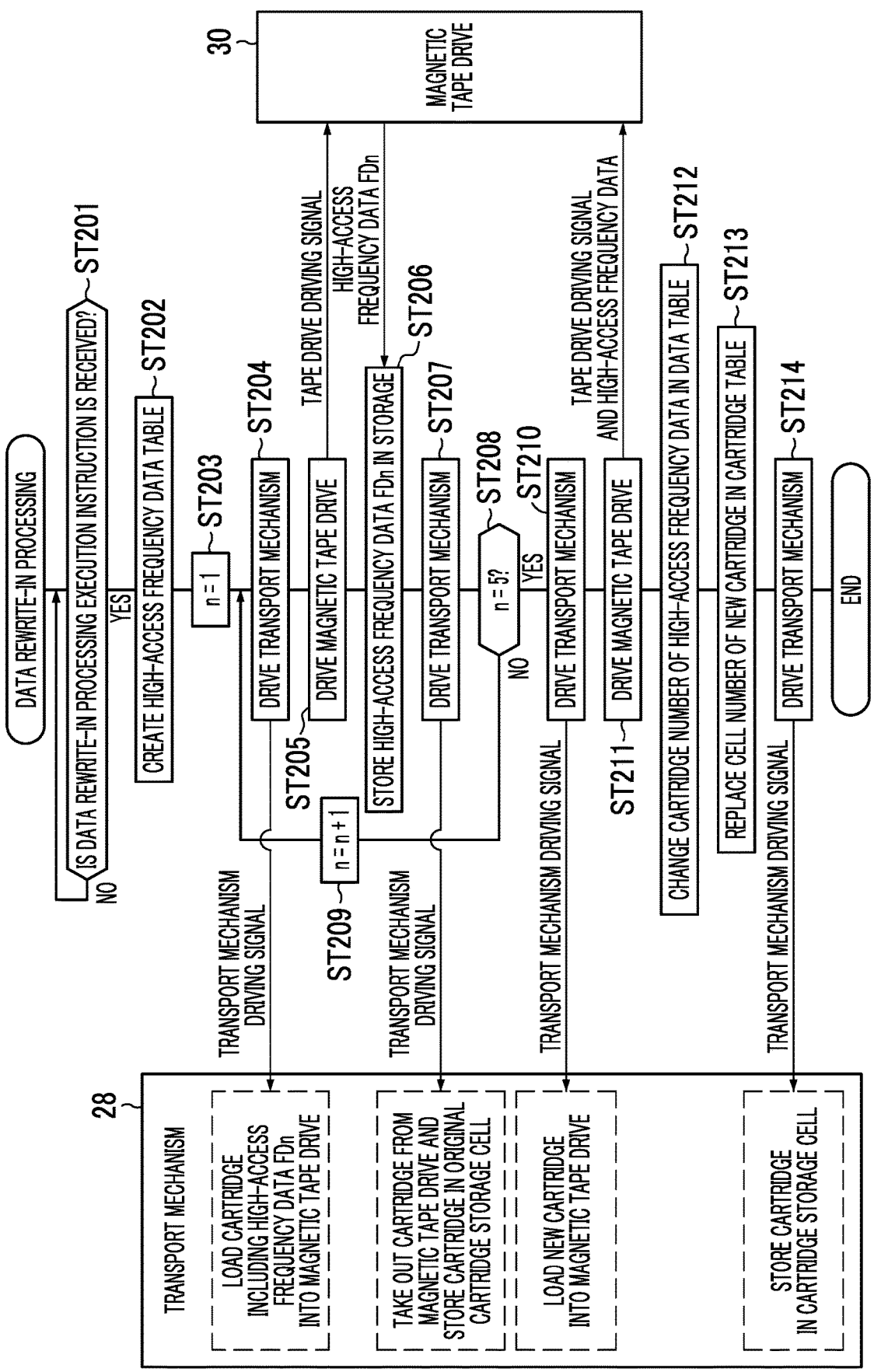
FIG. 15 is a flowchart illustrating an example of a flow of the data rewrite-in processing.

FIG. 15 shows an example of a flow of the data rewrite-in processing 72 that is executed in a case where the data rewrite-in processing execution instruction is received.

In the data rewrite-in processing 72 shown in FIG. 15, first, in Step ST201, the data rewrite-in unit 82 determines whether or not the data rewrite-in processing execution instruction is received. In Step ST201, in a case where the data rewrite-in unit 82 receives the data rewrite-in processing execution instruction, determination is made to be affirmative, and the data rewrite-in processing 72 proceeds to Step ST202. In Step ST201, in a case where the data rewrite-in unit 82 does not receive the data rewrite-in processing execution instruction, determination is made to be negative, and the data rewrite-in processing 72 repeats Step ST201.

In Step ST202, the data rewrite-in unit 82 creates the high-access frequency data table 92 from the data table 32. In the high-access frequency data table 92, the data numbers of the high-access frequency data FD1 to FD5, the cartridge number, and the access frequency are stored in association with one another. The data rewrite-in unit 82 stores the high-access frequency data table 92 in the storage 18. Thereafter, the data rewrite-in processing 72 proceeds to Step ST203.

In Step ST203, the data rewrite-in unit 82 sets n=1. Thereafter, the data rewrite-in processing 72 proceeds to Step ST204.

In Step ST204, the data rewrite-in unit 82 acquires the data number of the high-access frequency data FD1, the cartridge number, and the cell number with reference to the high-access frequency data table 92 and the cartridge table 34. The data rewrite-in unit 82 causes the transport mechanism 28 to take out the cartridge 20 including the high-access frequency data FD1 from the cartridge storage cell 24 and to load the cartridge 20 into the magnetic tape drive 30. Thereafter, the data rewrite-in processing 72 proceeds to Step ST205.

In Step ST205, the data rewrite-in unit 82 causes the magnetic tape drive 30 to read out the high-access frequency data FD1 from the magnetic tape MT of the cartridge 20 loaded into the magnetic tape drive 30. Thereafter, the data rewrite-in processing 72 proceeds to Step ST206.

In Step ST206, the data rewrite-in unit 82 stores the read-out high-access frequency data FD1 in the temporary data storage region 94 of the storage 18. Thereafter, the data rewrite-in processing 72 proceeds to Step ST207.

In Step ST207, the data rewrite-in unit 82 causes the transport mechanism 28 to store the cartridge 20 loaded into the magnetic tape drive 30 in the original cartridge storage cell 24. Thereafter, the data rewrite-in processing 72 proceeds to Step ST208.

In Step ST208, the data rewrite-in unit 82 determines whether or not a condition (hereinafter, also referred to as a "high-access frequency data readout end condition") of n=5 is satisfied. In Step ST208, in a case where the high-access frequency data readout end condition is satisfied, determination is made to be affirmative, and the data rewrite-in processing 72 proceeds to Step ST210. In a case where the high-access frequency data readout end condition is not satisfied, determination is made to be negative, and the data rewrite-in processing 72 proceeds to Step ST209.

In Step ST209, the data rewrite-in unit 82 increments n by one. Thereafter, the data rewrite-in processing 72 proceeds to Step ST204. In this way, the data rewrite-in unit 82 repeats Steps ST204 to ST207 while incrementing n by one until the high-access frequency data readout end condition is satisfied, whereby the high-access frequency data FD1 to FD5 are stored in the temporary data storage region 94.

In Step ST210, the data rewrite-in unit 82 causes the transport mechanism 28 to load the new cartridge 20-1 into the magnetic tape drive 30. Thereafter, the data rewrite-in processing 72 proceeds to Step ST211.

In Step ST211, the data rewrite-in unit 82 causes the magnetic tape drive 30 to write the high-access frequency data FD1 to FD5 stored in the temporary data storage region 94 in the magnetic tape MT of the new cartridge 20-1. Thereafter, the data rewrite-in processing 72 proceeds to Step ST212.

In Step ST212, the data rewrite-in unit 82 changes the cartridge numbers corresponding to the data numbers of the high-access frequency data FD1 to FD5 to the cartridge number of the new cartridge 20-1 in the data table 32. Thereafter, the data rewrite-in processing 72 proceeds to Step ST213.

In Step ST213, the data rewrite-in unit 82 changes the cell number corresponding to the cartridge number "CN21" of the new cartridge 20-1 to the cell number "A1" of the cartridge storage cell 24 having the shortest transport path by the transport mechanism 28 in the cartridge table 34. The data rewrite-in unit 82 changes the cell number corresponding to the cartridge number of the cartridge 20 originally stored in the cartridge storage cell 24 of the cell number "A1" to the cell number of the empty cartridge storage cell 24. Thereafter, the data rewrite-in processing 72 proceeds to Step ST214.

In Step ST214, the data rewrite-in unit 82 causes the transport mechanism 28 to move the cartridge 20 originally stored in the cartridge storage cell 24 of the cell number "A1" to the cartridge storage cell 24 of the changed cell number. Thereafter, the data rewrite-in unit 82 causes the transport mechanism 28 to take out the new cartridge 20-1 from the magnetic tape drive 30 and to store the new cartridge 20-1 in the cartridge storage cell 24 of the cell number "A1". With this, the data rewrite-in unit 82 ends the data rewrite-in processing 72.

Figure 16:
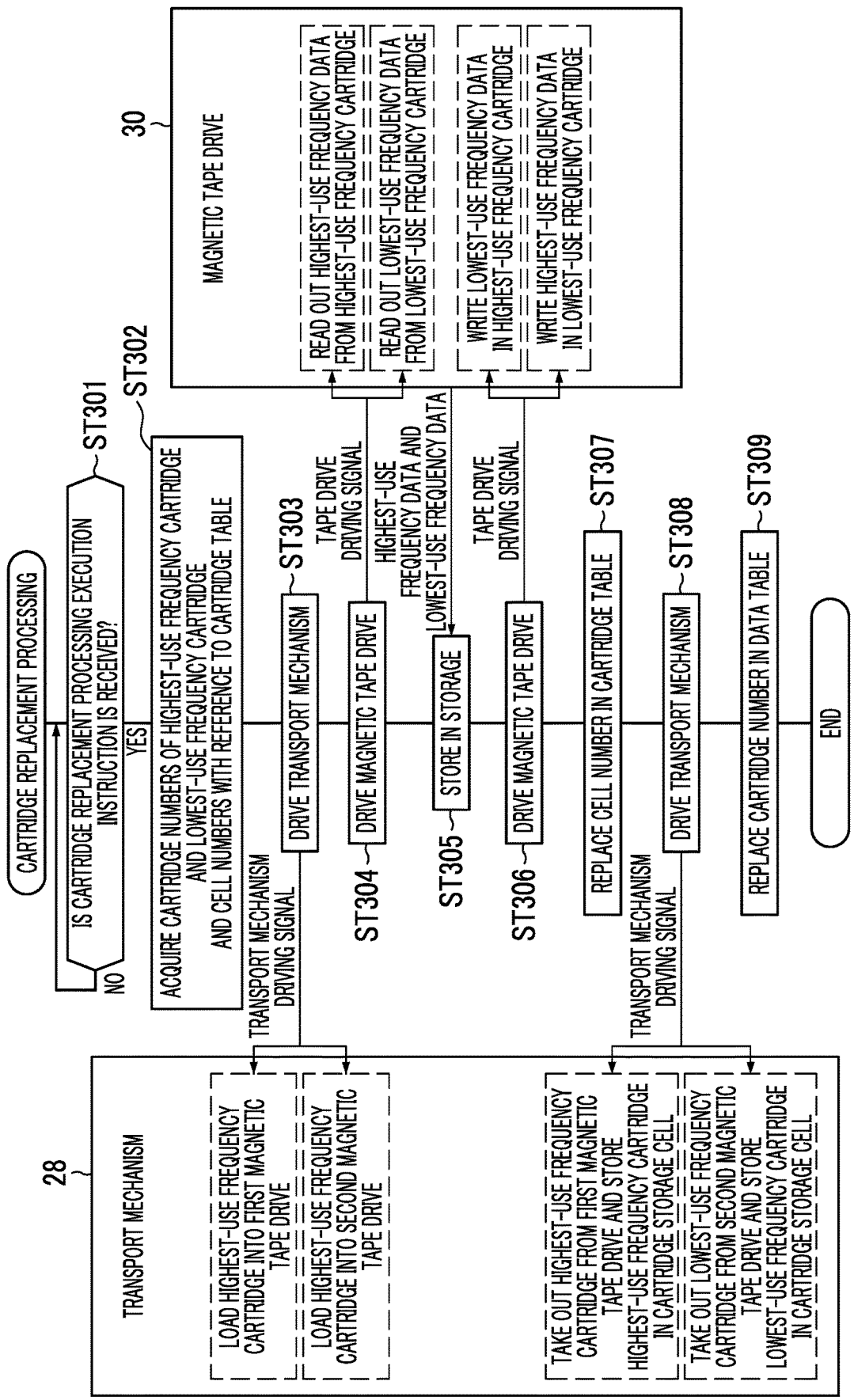
FIG. 16 is a flowchart showing an example of a flow of the cartridge replacement processing.

FIG. 16 shows an example of a flow of the cartridge replacement processing 74 that is executed in a case where the cartridge replacement processing execution instruction is received.

In the cartridge replacement processing 74 shown in FIG. 16, first, in Step ST301, the cartridge replacement unit 84 determines whether or not the cartridge replacement processing execution instruction is received. In Step ST301, in a case where the cartridge replacement unit 84 receives the cartridge replacement processing execution instruction, determination is made to be affirmative, and the cartridge replacement processing 74 proceeds to Step ST302. In Step ST301, in a case where the cartridge replacement unit 84 does not receive the cartridge replacement processing execution instruction, determination is made to be negative, and the cartridge replacement processing 74 repeats Step ST301.

In Step ST302, the cartridge replacement unit 84 acquires the cartridge numbers of the highest-use frequency cartridge and the lowest-use frequency cartridge and the cell numbers with reference to the cartridge table 34. Thereafter, the cartridge replacement processing 74 proceeds to Step ST303.

In Step ST303, the cartridge replacement unit 84 causes the transport mechanism 28 to load the highest-use frequency cartridge into the first magnetic tape drive 30-1 and to load the lowest-use frequency cartridge into the second magnetic tape drive 30-2. Thereafter, the cartridge replacement processing 74 proceeds to Step ST304.

In Step ST304, the cartridge replacement unit 84 causes the first magnetic tape drive 30-1 to read out the highest-use frequency data from the highest-use frequency cartridge. The cartridge replacement unit 84 causes the second magnetic tape drive 30-2 to read out the lowest-use frequency data from the lowest-use frequency cartridge. Thereafter, the cartridge replacement processing 74 proceeds to Step ST305.

In Step ST305, the cartridge replacement unit 84 stores the read-out highest-use frequency data and lowest-use frequency data in the temporary data storage region 94 of the storage 18. Thereafter, the cartridge replacement processing 74 proceeds to Step ST306.

In Step ST306, the cartridge replacement unit 84 causes the magnetic tape drive 30 to write the lowest-use frequency data stored in the temporary data storage region 94 in the highest-use frequency cartridge. The cartridge replacement unit 84 causes the magnetic tape drive 30 to write the highest-use frequency data stored in the temporary data storage region 94 in the lowest-use frequency cartridge. Thereafter, the cartridge replacement processing 74 proceeds to Step ST307.

In Step ST307, the cartridge replacement unit 84 replaces the cell number corresponding to the cartridge number of the highest-use frequency cartridge and the cell number corresponding to the cartridge number of the lowest-use frequency cartridge in the cartridge table 34. Thereafter, the cartridge replacement processing 74 proceeds to Step ST308.

In Step ST308, the cartridge replacement unit 84 causes the transport mechanism 28 to take out the highest-use frequency cartridge from the first magnetic tape drive 30-1 and to store the highest-use frequency cartridge in the cartridge storage cell 24 of the replaced cell number. The cartridge replacement unit 84 causes the transport mechanism 28 to take out the lowest-use frequency cartridge from the second magnetic tape drive 30-2 and to store the lowest-use frequency cartridge in the cartridge storage cell 24 of the replaced cell number. With this, the cartridge (lowest-use frequency cartridge) where the high-access frequency data FD1 to FD5 are written is stored in the cartridge storage cell 24 having the shortest transport path by the transport mechanism 28. Thereafter, the cartridge replacement processing 74 proceeds to Step ST309.

In Step ST309, the cartridge replacement unit 84 replaces the cartridge number corresponding to the data number of data stored in the highest-use frequency cartridge and the cartridge number corresponding to the data number of data stored in the lowest-use frequency cartridge in the data table 32. With this, the cartridge replacement unit 84 ends the cartridge replacement processing 74 of replacing data of the highest-use frequency cartridge and data of the lowest-use frequency cartridge.

As described above, the cartridge management system 10 according to the embodiment manages a plurality of cartridges 20, in each of which the magnetic tape MT is housed. The library controller 14 that controls the cartridge management system 10 executes the data rewrite-in processing 72 and the cartridge replacement processing 74. The data rewrite-in processing 72 is processing of rewriting data stored in the magnetic tape MT in the specific cartridge among a plurality of cartridges 20, for example, the new cartridge 20-1 based on the access frequency. Accordingly, with the data rewrite-in processing 72, data stored in the magnetic tape MT is aggregated in the specific cartridge based on the access frequency. The cartridge replacement processing 74 is processing of replacing data stored in the magnetic tape MT of the specific cartridge and data stored in the magnetic tape MT of another cartridge. Accordingly, with the cartridge replacement processing 74, data stored in the magnetic tape MT of the specific cartridge is replaced with data stored in the magnetic tape MT of another cartridge, whereby it is possible to equalize the consumption rate of each cartridge 20 among a plurality of cartridges 20. With this, it is possible to extend the service life of all the cartridges 20 stored in the magnetic tape library 12 compared to a case where the data rewrite-in processing 72 and the cartridge replacement processing 74 are not executed.

With the cartridge management system 10 according to the embodiment, in the data rewrite-in processing 72, the data rewrite-in unit 82 rewrites the high-access frequency data FD1 to FD5 having the access frequency higher than the reference access frequency in the specific cartridge to aggregate the high-access frequency data FD1 to FD5 in the specific cartridge. Accordingly, it is possible to increase the use frequency of the specific cartridge compared to a case where the data rewrite-in processing 72 is not executed.

With the cartridge management system 10 according to the embodiment, the specific cartridge is the new cartridge 20-1. Accordingly, it is possible to increase the use frequency of the new cartridge 20-1 compared to a case where the data rewrite-in processing 72 is not executed.

With the cartridge management system 10 according to the embodiment, the data rewrite-in unit 82 executes the data rewrite-in processing 72 at regular intervals. Accordingly, compared to a case where the data rewrite-in processing 72 is executed manually, it is possible to reduce labor for regular data rewrite-in work.

With the cartridge management system 10 according to the embodiment, in the cartridge replacement processing 74, the cartridge replacement unit 84 replaces data stored in the magnetic tape MT of the specific cartridge with data stored in the magnetic tape MT of the cartridge having the use frequency lower than the reference use frequency. Accordingly, it is possible to equalize the consumption rate of each cartridge 20 among a plurality of cartridges 20 compared to a case where the cartridge replacement unit 84 is not executed.

With the cartridge management system 10 according to the embodiment, the cartridge replacement unit 84 executes the cartridge replacement processing 74 at regular intervals. Accordingly, it is possible to reduce labor for regular replacement work compared to a case where the cartridge replacement processing 74 is executed manually.

With the cartridge management system 10 according to the embodiment, a plurality of cartridges 20 are housed in the cartridge storage cells 24 of the storage rack 22 in units of a predetermined number of cartridges, for example, one by one. The library controller 14 causes the transport mechanism 28 provided in the storage rack 22 to take out the specific cartridge 20 from the cartridge storage cell 24 and to load the specific cartridge 20 taken out from the cartridge storage cell 24 by the transport mechanism 28 into the magnetic tape drive 30. Accordingly, the library controller 14 can cause the transport mechanism 28 to take out the cartridge 20 from the cartridge storage cell 24 and to load the cartridge 20 into the magnetic tape drive 30.

With the cartridge management system 10 according to the embodiment, the cartridge storage cell 24 where the specific cartridge is stored is the cartridge storage cell 24 having the shortest transport path from the cartridge storage cell 24 to the magnetic tape drive 30 by the transport mechanism 28. Accordingly, it is possible to realize quick taking out of the specific cartridge and loading of the specific cartridge into the magnetic tape drive 30 compared to a case where the specific cartridge is not stored in the cartridge storage cell 24 having the shortest transport path.

In the above-described embodiment, although, in the data rewrite-in processing 72, the data rewrite-in unit 82 writes the high-access frequency data FD1 to FD5 in the new cartridge 20-1, the technique of the present disclosure is not limited thereto. The data rewrite-in unit 82 may write the high-access frequency data FD1 to FD5 in the cartridge 20 having the use frequency lower than the reference use frequency. The reference use frequency is a value determined based on a minimum number of times, in which the durability of the cartridge 20 can be maintained, obtained by a computer simulation, a sensory test, and/or a test with a real machine. The reference use frequency is an example of a "second reference use frequency" according to the technique of the present disclosure. The high-access frequency data FD1 to FD5 are aggregated in the cartridge 20 having the use frequency lower than the reference use frequency, whereby it is possible to increase the use frequency of the cartridge 20 having the low use frequency.

In the above-described embodiment, although the data rewrite-in processing 72 is executed at regular intervals, for example, once a month, the technique of the present disclosure is not limited thereto, and a timing at which the data rewrite-in processing 72 is executed can be changed. The data rewrite-in processing 72 may be executed by the data rewrite-in unit 82, for example, in a case where the user gives the data rewrite-in processing execution instruction to the library controller 14 through the host computer 16.

In the above-described embodiment, although the cartridge replacement processing 74 is executed at regular intervals, for example, once a year, the technique of the present disclosure is not limited thereto, and a timing at which the cartridge replacement processing 74 is executed can be changed. The cartridge replacement processing 74 may be executed by the cartridge replacement unit 84, for example, in a case where the user gives the cartridge replacement processing execution instruction to the library controller 14 through the host computer 16. The cartridge replacement processing 74 may be executed by the cartridge replacement unit 84 in a case where a use count of the highest-use frequency cartridge reaches a specific value, for example, 10000 times. In this case, it is possible to easily equalize the consumption rate of each cartridge 20 among the cartridges 20 compared to a case where the cartridge replacement processing 74 is not executed depending on the use count of the highest-use frequency cartridge.

In the above-described embodiment, although each cartridge storage cell 24 stores one cartridge 20, the technique of the present disclosure is not limited thereto. Each cartridge storage cell 24 may house a plurality of predetermined number of cartridges 20.

In the above-described embodiment, although a form example where the control program 88 is stored in the NVM 78 has been described, the technique of the present disclosure is not limited thereto. For example, as shown in FIG. 17, the control program 88 may be stored in a storage medium 100.

The storage medium 100 is a non-transitory storage medium. An example of the storage medium 100 includes any portable storage medium, such as an SSD or a USB memory. The control program 88 that is stored in the storage medium 100 is installed on the library controller 14. The CPU 76 executes the data readout processing 70, the data rewrite-in processing 72, and the cartridge replacement processing 74 (hereinafter, these kinds of processing are comprehensively referred to as "control processing") following the control program 88. In the example shown in FIG. 17, the CPU 76 is a single CPU, but may be a plurality of CPUs.

The control program 88 may be stored in a storage unit of another computer, a server apparatus, or the like that is connected to the library controller 14 through a communication network (not shown), and the control program 88 may be downloaded depending on a request from the library controller 14 and may be installed on the library controller 14.

Figure 17:
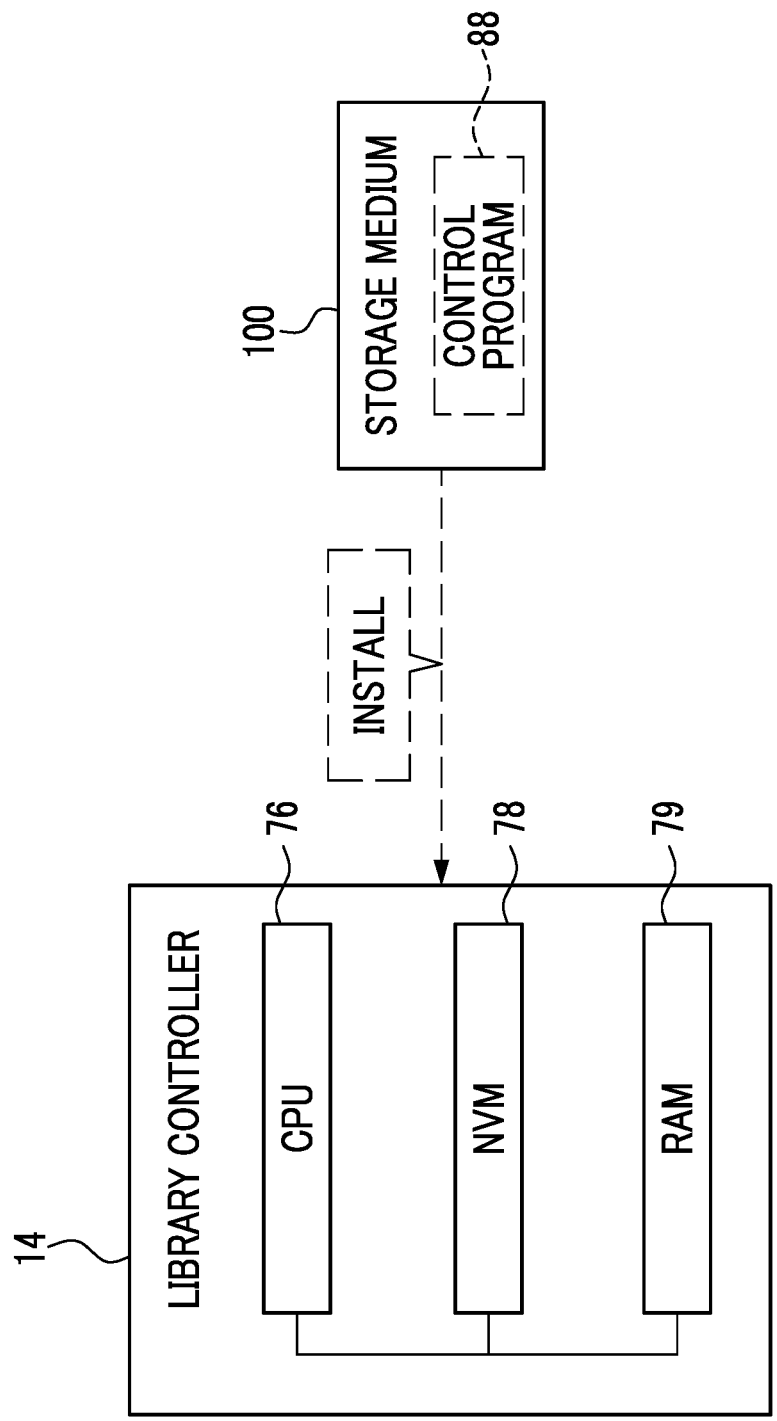
FIG. 17 is a block diagram showing an example of an aspect where a control program is installed on a host computer from a storage medium in which the program is stored.

In the example shown in FIG. 17, although the library controller 14 has been described, the technique of the present disclosure is not limited thereto, and a device including an ASIC, an FPGA, and/or a PLD may be applied instead of the library controller 14. Instead of the library controller 14, a combination of a hardware configuration and a software configuration may be used.

As a hardware resource that executes the control processing, various processors described below can be used. Examples of the processors include a CPU that is a general-purpose processor configured to execute software, that is, a program to function as the hardware resource that executes the control processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the control processing.

The hardware resources for executing the control processing may be configured with one of various processors or may be configured with a combination of two or more processors (for example, a combination of a plurality of FPGAs or a combination of a CPU and an FPGA) of the same type or different types. The hardware resource that executes the control processing may be one processor.

As an example where the hardware resource is configured with one processor, first, there is a form in which one processor is configured with a combination of one or more CPUs and software, and the processor functions as the hardware resource that executes the control processing. Second, as represented by SoC or the like, there is a form in which a processor that realizes all functions of a system including a plurality of hardware resources, which execute the control processing, with one IC chip is used. In this way, the control processing is realized using one or more of various processors described above as the hardware resource.

In addition, as the hardware structures of various processors, more specifically, an electric circuit into which circuit elements, such as semiconductor elements, are combined can be used. The above-described control processing is merely an example. Therefore, it is needless to say that unnecessary steps may be deleted, new steps may be added, or a processing order may be rearranged without departing from the spirit and scope of the present disclosure.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or portions may be replaced in the above-described contents and the illustrated contents without departing from the spirit and scope of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A cartridge management system that manages a plurality of cartridges, in each of which a magnetic tape is housed, the cartridge management system comprising: a processor; and a memory incorporated in or connected to the processor, wherein the processor is configured to execute data rewrite-in processing of rewriting data stored in the magnetic tape, in a specific cartridge among the plurality of cartridges based on an access frequency indicating a frequency of access to the data, and cartridge replacement processing of replacing the data stored in the magnetic tape of the specific cartridge and the data stored in the magnetic tape of another cartridge among the plurality of cartridges; wherein, in the data rewrite-in processing, the processor is configured to rewrite high-access frequency data that is data having the access frequency higher than a reference access frequency, in the specific cartridge to aggregate the high-access frequency data in the specific cartridge.

2. The cartridge management system according to claim 1, wherein the other cartridge is a cartridge having a use frequency lower than a first reference use frequency among the plurality of cartridges.

3. The cartridge management system according to claim 1, wherein the specific cartridge is a cartridge having a use frequency lower than a second reference use frequency among the plurality of cartridges.

4. The cartridge management system according to claim 1, wherein the specific cartridge is a new cartridge.

5. The cartridge management system according to claim 1, wherein the processor is configured to execute the data rewrite-in processing at regular intervals.

6. The cartridge management system according to claim 1, wherein the processor is configured to execute the cartridge replacement processing at regular intervals.

7. The cartridge management system according to claim 1, wherein the processor is configured to execute the cartridge replacement processing depending on a use count of the cartridge.

8. The cartridge management system according to claim 1, wherein the plurality of cartridges are housed in cells of a container in units of a predetermined number of cartridges, and the processor is configured to cause a transport mechanism provided in the container to take out the specific cartridge from the cell and to load the specific cartridge taken out from the cell by the transport mechanism into a magnetic tape drive.

9. The cartridge management system according to claim 8, wherein the cell is a cell having a shortest transport path through which the specific cartridge is transported from the cell to the magnetic tape drive by the transport mechanism.

10. A method of operating a cartridge management system that includes a processor and manages a plurality of cartridges, in each of which a magnetic tape is housed, the method comprising: executing data rewrite-in processing of rewriting data stored in the magnetic tape, in a specific cartridge among the plurality of cartridges based on an access frequency indicating a frequency of access to the data; and executing cartridge replacement processing of replacing the data stored in the magnetic tape of the specific cartridge and the data stored in the magnetic tape of another cartridge among the plurality of cartridges; wherein, in the data rewrite-in processing the processor is configured to rewrite high-access frequency data that is data having the access frequency higher than a reference access frequency, in the specific cartridge to aggregate the high-access frequency data in the specific cartridge.

11. A non-transitory computer-readable storage medium storing a program executable by a computer, which is applied to a cartridge management system that manages a plurality of cartridges, in each of which a magnetic tape is housed, to perform a process comprising: executing data rewrite-in processing of rewriting data stored in the magnetic tape, in a specific cartridge among the plurality of cartridges based on an access frequency indicating a frequency of access to the data; and executing cartridge replacement processing of replacing the data stored in the magnetic tape of the specific cartridge and the data stored in the magnetic tape of another cartridge among the plurality of cartridges; wherein, in the data rewrite-in processing, the processor is configured to rewrite high-access frequency data that is data having the access frequency higher than a reference access frequency, in the specific cartridge to aggregate the high-access frequency data in the specific cartridge.

\* \* \* \* \*